US011803550B2

(12) United States Patent
Slavitch et al.

(10) Patent No.: US 11,803,550 B2
(45) Date of Patent: *Oct. 31, 2023

(54) WORKLOAD-AWARE COLUMN IMPRINTS

(71) Applicant: SAP SE, Walldorf (DE)

(72) Inventors: Noah Slavitch, Waterloo (CA); Reza Sherkat, Waterloo (CA)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,188

(22) Filed: May 20, 2022

(65) Prior Publication Data

US 2022/0277012 A1    Sep. 1, 2022

Related U.S. Application Data

(63) Continuation of application No. 16/880,730, filed on May 21, 2020, now Pat. No. 11,366,811.

(51) Int. Cl.
*G06F 16/2455* (2019.01)
*G06F 16/22* (2019.01)
*G06F 16/248* (2019.01)
*G06F 9/30* (2018.01)

(52) U.S. Cl.
CPC .... *G06F 16/24554* (2019.01); *G06F 9/30029* (2013.01); *G06F 16/2237* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 11,366,811 B2* | 6/2022 | Slavitch | | G06F 16/2237 |
| 2021/0365458 A1* | 11/2021 | Slavitch | | G06F 16/248 |
| 2022/0277012 A1* | 9/2022 | Slavitch | | G06F 16/248 |

OTHER PUBLICATIONS

Non-Final Office Action received in U.S. Appl. No. 16/880,730, dated Sep. 14, 2021, 6 pages.
Rotem et al., "Efficient Binning for Bitmap Indices on High-Cardinality Attributes," ResearchGate, Lawrence Berkeley National Laboratory, Jan. 2004, 14 pages.
Kraska, "The Case for Learned Index Structures," SIGMOD ' 18, Jun. 10-15, 2018, 16 pages.
Sherkat, "Page as you go: Piecewise Columnar Access in SAP HANA," SIGMOD ' 16, Jun. 26-Jul. 1, 2016, 12 pages.

(Continued)

*Primary Examiner* — Kim T Nguyen
(74) *Attorney, Agent, or Firm* — Klarquist Sparkman, LLP

(57) ABSTRACT

Techniques and solutions are described that can be used to determine data subsets of a data set that may be responsive to a query. In one aspect, imprints are created for the data subsets, where an imprint indicates whether, for a plurality of bins, a data subset contains values within respective bins. The bins are defined at least in part using data for a set of queries. In another aspect, at least one bin of a plurality of bins is designated to be associated with values of the data set satisfying a threshold frequency. In a further aspect, imprints are created for a plurality of bins, where an imprint indicates whether the plurality of data subsets comprise a value for a given bin. A query imprint can be compared with the data subset imprints or bin imprints to determine data subsets that may be responsive to an associated query.

23 Claims, 15 Drawing Sheets

(56) References Cited

OTHER PUBLICATIONS

Sun, "Fine-grained Partitioning for Aggressive Data Skipping," SIGMOD ' 14, Jun. 22-27, 2014, 12 pages.

Sidirourgos, "Column Imprints: A secondary Index Structure," SIGMOD ' 13, Jun. 22-27, 12 pages.

Morzy et al., "Hierarchical Bitmap Index: An Efficient and Scalable Indexing Technique for Set-Valued Attributes," ADBIS 2003, LNCS 2798, pp. 236-252, 18 pages.

Faust et al., "Fast Column Scans: Paged Indices for In-Memory Column Stores," In Proc. IMDM'13, 2013, 12 pages.

S. Amer-Yahia and T. Johnson. Optimizing Queries on Compressed Bitmaps. In International Conference on Very Large Data Bases, Cairo, Egypt, Sep. 2000. Morgan Kaufmann, 10 pages.

G. Antoshenkov. Byte-aligned Bitmap Compression.Technical report, Oracle Corp., 1994,1 page.

G. Antoshenkov and M. Ziauddin. Query Processing and Optimization in ORACLE RDB. VLDB Journal, 5:229-237, 1996.

R. E. Bellman. Dynamic Programming. Dover Publications, Incorporated, 2003. [book https://www.amazon.com/Dynamic-Programming-Dover-Computer-Science/dp/0486428095, 11 pages.

C.-Y. Chan and Y. E. Ioannidis. Bitmap Index Design and Evaluation. In SIGMOD, Seattle, Washington, USA, Jun. 1998. ACM Press, 12 pages.

C. Y. Chan and Y. E. Ioannidis. An Efficient Bitmap Encoding Scheme for Selection Queries. In SIGMOD, Philadelphia, Pennsylvania, USA, Jun. 1999. ACM Press, 12 pages.

S. Chaudhuri and U. Dayal. An Overview of Data wharehousing and OLAP Technology. ACM SIGMOD Record, 26(1):65-74, Mar. 1997.

FITS—Flexible Image Transport System. http://heasarc.gsfc.nasa.gov/docs/heasarc/fits.htm, 1 page.

T. Johnson. Performance Measurements of Compressed Bitmap Indices. In International Conference on Very Large Data Bases, Edinburgh, Scotland, Sep. 1999. Morgan Kaufmann, 12 pages.

N. Koudas. Space efficient bitmap indexing. In Proc. of the 9th CIKM, 2000. https://dl.acm.org/doi/10.1145/354756.354819, 8 pages.

P. O'Neil. Model 204 Architecture and Performance. In Proc. of the 2nd HPTS, 1987. https://link.springer.com/chapter/10.1007/3-540-51085-0_42, 21 pages.

P. O'Neil and D. Quass. Improved Query Performance with Variant Indexes. In Proceedings ACM SIGMOD International Conference on Management of Data, Tucson, Arizona, USA, May 1997. ACM Press, 13 pages.

Sloan Digital Sky Survey. http://classic.sdss.org/dr1/, at least as early as May 21, 2020, 2 pages.

K. Stockinger, K. Wu, and A. Shoshani. Evaluation Strategies for Bitmap Indices with Binning. In International Conference on Database and Expert Systems Applications (DEXA), Zaragoza, Spain, Sep. 2004. Springer-Verlag, 10 pages.

A. Szalay, P. Kunszt, A. Thakar, J. Gray, and D. Slutz. Designing and Mining Multi-Terabyte Astronomy Archives: The Sloan Digital Sky Survey. In SIGMOD, Dallas, Texas, USA, May 2000. ACM Press, https://dl.acm.org/doi/10.1145/335191.335439, May 2000, 4 pages.

K. Wu, E. J. Otoo, and A. Shoshani. On the Performance of Bitmap Indices for High Cardinality Attributes. In International Conference on Very Large Data Bases, Toronto, 2004, 13 pages.

K. Wu, W.-M. Zhang, V. Perevoztchikov, J. Lauret, and A. Shoshani. The Grid Collector: Using an Event Catalog to Speedup User Analysis in Distributed Environment. In Computing in High Energy and Nuclear Physics (CHEP) 2004, 4 pages.

K.-L. Wu and P.S. Yu. Range-Based Bitmap Indexing for High-Cardinality Attributes with Skew. Technical report, IBM Watson Research Center, May 1996, 6 pages.

M.-C. Wu and A. P. Buchmann. Encoded Bitmap Indexing for Data Warehouses. In International Conference on Data Engineering, Orlando, Florida, USA, Feb. 1998. IEEE Computer Society Press, 11 pages.

D. J. Abadi, D. S. Myers, D. J. DeWitt, and S. R. Madden. Materialization Strategies in a Column-Oriented DBMS. In *Proc. of the 23rd ICDE*, 2007, 11 pages.

J. L. Beckham. The CNET E-Commerce Data Set, 2005, 12 pages.

N. Beckmann, H. P. Kriegel, R. Schneider, and B. Seeger. The R*-tree: an efficient and robust access method for points and rectangles. In *Proc. of the ACM SIGMOD*, 1990. https://dl.acm.org/doi/10.1145/93605.98741, 10 pages.

P. Boncz, M. Zukowski, and N. Nes. MonetDB/X100: Hyper-Pipelining Query Execution. In *CIDR*, 2005, 13 pages.

G. Canahuate, M. Gibas, and H. Ferhatosmanoglu. Update Conscious Bitmap Indices. In *19th SSDBM*, 2007, 12 pages.

L. Gosink, K. Wu, E. Bethel, J. D. Owens, and K. I. Joy. Data Parallel Bin-Based Indexing for Answering Queries on Multi-core Architectures. In *Proc. of the SSDBM*, 2009, 20 pages.

N. Goyal and Y. Sharma. New binning strategy for bitmap indices on high cardinality attributes. In *Proc. of the $2^{nd}$ Bangalore Annual Compute Conference*, 2009, 6 pages.

J. Hellerstein, J. Naughton, and A. Pfeffer. Generalized Search Trees for Database Systems. In *Proc. of the 21th VLDB*, 1995, 12 pages.

S. Heman, M. Zukowski, N. Nes, L. Sidirourgos, and P. Boncz. Positional Update Handling in Column Stores. In *Proc. of the ACM SIGMOD*, 2010, 12 pages.

S. Idreos, M. Kersten, and S. Manegold. Database Cracking. In *Proc. of the 3rd CIDR*, 2007, 12 pages.

M. Stonebraker et. al. C-Store: A Column Oriented DBMS. In *Proc. of the 31st VLDB*, 2005, 12 pages.

S. Manegold, M. Kersten, and P. Boncz. Database Architecture Evolution: Mammals Flourished long before Dinosaurs became Extinct. In *Proc. of the 35th VLDB*, 2009, 6 pages.

Column store features, https://www.monetdb.org/content/column-store-features, at least as early as May 21, 2020, 5 pages.

P. O'Neil and G. Graefe. Multi-table joins through bitmapped join indices. *SIGMOD Rec.*, 24(3), 1995. https://dl.acm.org/doi/10.1145/211990.212001, 4 pages.

R. R. Sinha and M.Winslett. Multi-resolution bitmap indexes for scientific data. *ACM Trans. Database Syst.*, 32(3), 2007, 38 pages.

H. Wong, H. Liu, F. Olken, D. Rotem, and L. Wong. Bit Transposed Files. In *Proc. of the 11th VLDB*, 1985, 10 pages.

K. Wu, K. Madduri, and S. Canon. Multi-level bitmap indexes for flash memory storage. In *Proc. of the $14^{th}$ IDEAS*, 2010, 20 pages.

K. Wu, E. J. Otoo, and A. Shoshani. Compressing Bitmap Indexes for Faster Search Operations. In *Proc. of the $14^{th}$ SSDBM*, 2002, 10 pages.

K. Wu, E. J. Otoo, and A. Shoshani. Optimizing bitmap indices with efficient compression. *ACM Trans. Database Syst.*, 31(1), 2006, 38 pages.

Wu, Kesheng and Kurt Stockinger. "LBNL-60891 Performance of Multi-Level and Multi-Component Compressed Bitmap Indexes." (2007).

European Search Report received in European Patent Application No. 21173213.3-1213, dated Oct. 21, 2021, 12 pages.

Sidirourgos et al., "col. imprints: a secondary index structure," Proceedings of the 2013 International Conference on Management of Data, Sigmod ' 13, Jan. 1, 2013, p. 893, 12 pages.

Rotem et al., "Optimizing candidate check costs for bitmap indices," Proceedings of the $14^{th}$ International Conference on Information and Knowledge Management, CIKM 2005, Bremen, Germany, Oct. 31-Nov. 5, 2005 [International Conference on Information Knowledge Management], New York, NY, ACM, Oct. 31, 2005, pp. 648-355.

Wu et al., "Breaking the Curse of Cardinality on Bitmap Indexes," Jul. 9, 2008, Scientific and Statistical Database Management; [Lecture Notes in Computer Science] Springer Berlin Heidelberg, Berlin Heidelberg, pp. 348-365.

Notice of Allowance received in U.S. Appl. No. 16/880,730, dated Feb. 23, 2022, 19 pages.

* cited by examiner

Left Cost:
  Cost: Running cost of at end point to be analyzed, initially 0
  tWeight: Cumulative weight of gaps until the endpoint to be analyzed, initially 0
  tRight: Cumulative number of right end points since last bin boundary (isBin == 1)
  lBinCost: vector representing "left hand cost" of placing a bin at each end point. Each element of vector is initially 0

A: Pseudocode (iterating from smallest end point to largest end point):
  Add $g_i$*tRight to Cost ($g_i$ is total weight at gap $g_i$)
  Add $e_{i-1}$ . l * tWeight to Cost ($e_{i-1}$.l is l value for the end point $e_{i-1}$)
  Add $g_i$ to tWeight
  Add $e_i$.r to tRight
  If isBin($e_i$) == 1, then tWeight = 0 and tRight = 0
  Set lBinCost[i] = Cost
  Move to endpoint $e_{i+1}$ Right Cost:
  Cost: Running cost of at end point to be analyzed, initially 0
  tWeight: Cumulative weight of gaps until the endpoint to be analyzed, initially 0
  tLeft: Cumulative number of left end points since last bin boundary (isBin == 1)
  rBinCost: vector representing "right hand cost" of placing a bin at each end point. Each element of vector is initially 0

B: Pseudocode (iterating from the largest end point, $e_n$, to the smallest end point, $e_0$)
  Add $g_{i+1}$*tLeft to Cost ($g_i+1$ is total weight at gap $g_i+1$)
  Add $e_{i+1}$ . r * tWeight to Cost ($e_{i+1}$.r is r value for the end point $e_{i+1}$)
  Add $g_{i+1}$ to tWeight
  Add $e_i$.l to tLeft
  If isBin($e_i$) == 1, then tWeight = 0 and tLeft = 0
  Set rBinCost[i] = Cost
  Move to endpoint $e_{i-1}$

FIG. 2A

C: Pseudocode:
For each $e_i$, calculate $e_i.totalCost$=$lBinCost[i]$ + $rBinCost[i]$ D: Pseudocode
Find ei with lowest total cost where isBin == 0
Set isBin ei to 1
Repeat A-D until number of bins satisfied

FIG. 2B

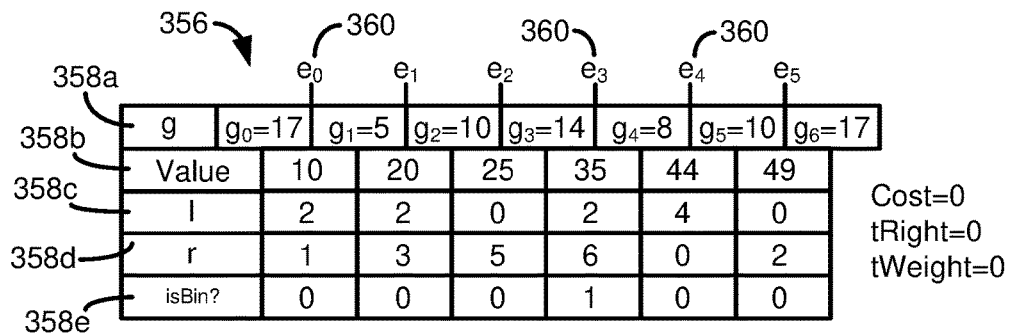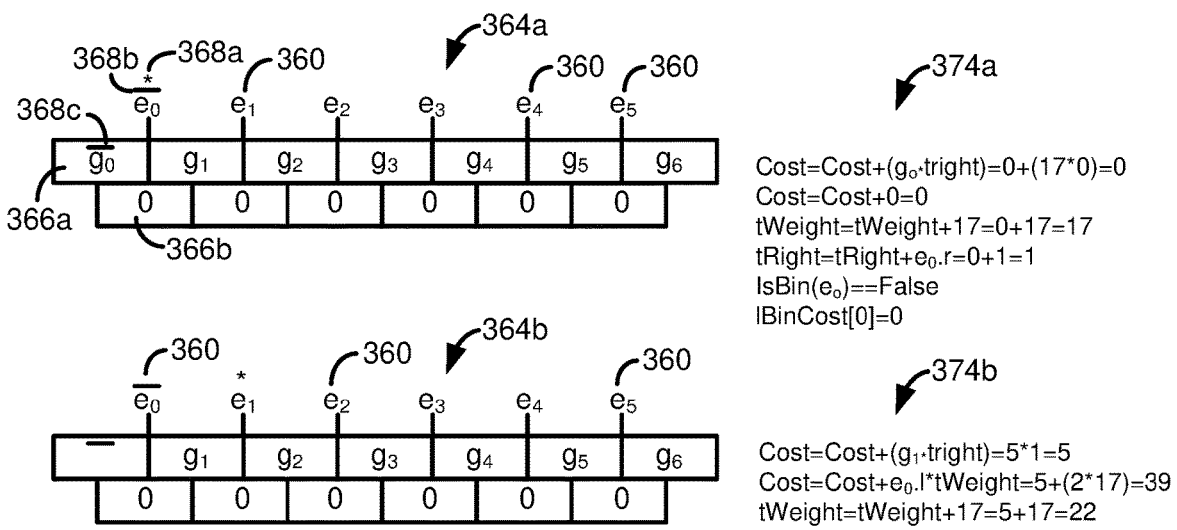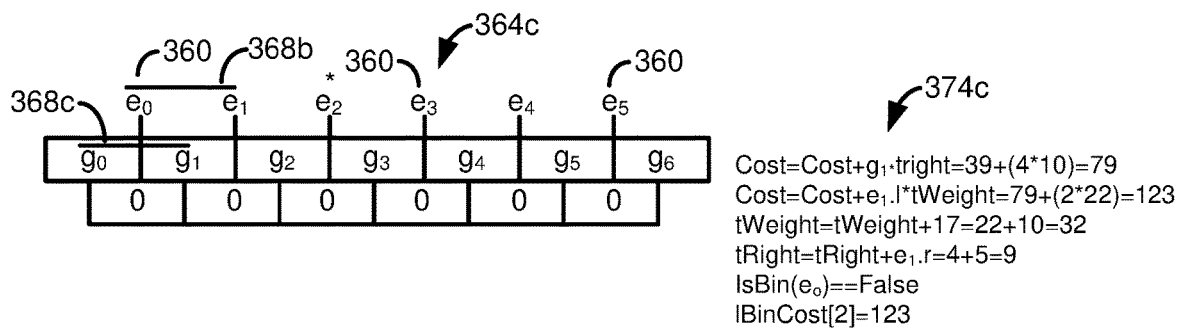
FIG. 3D

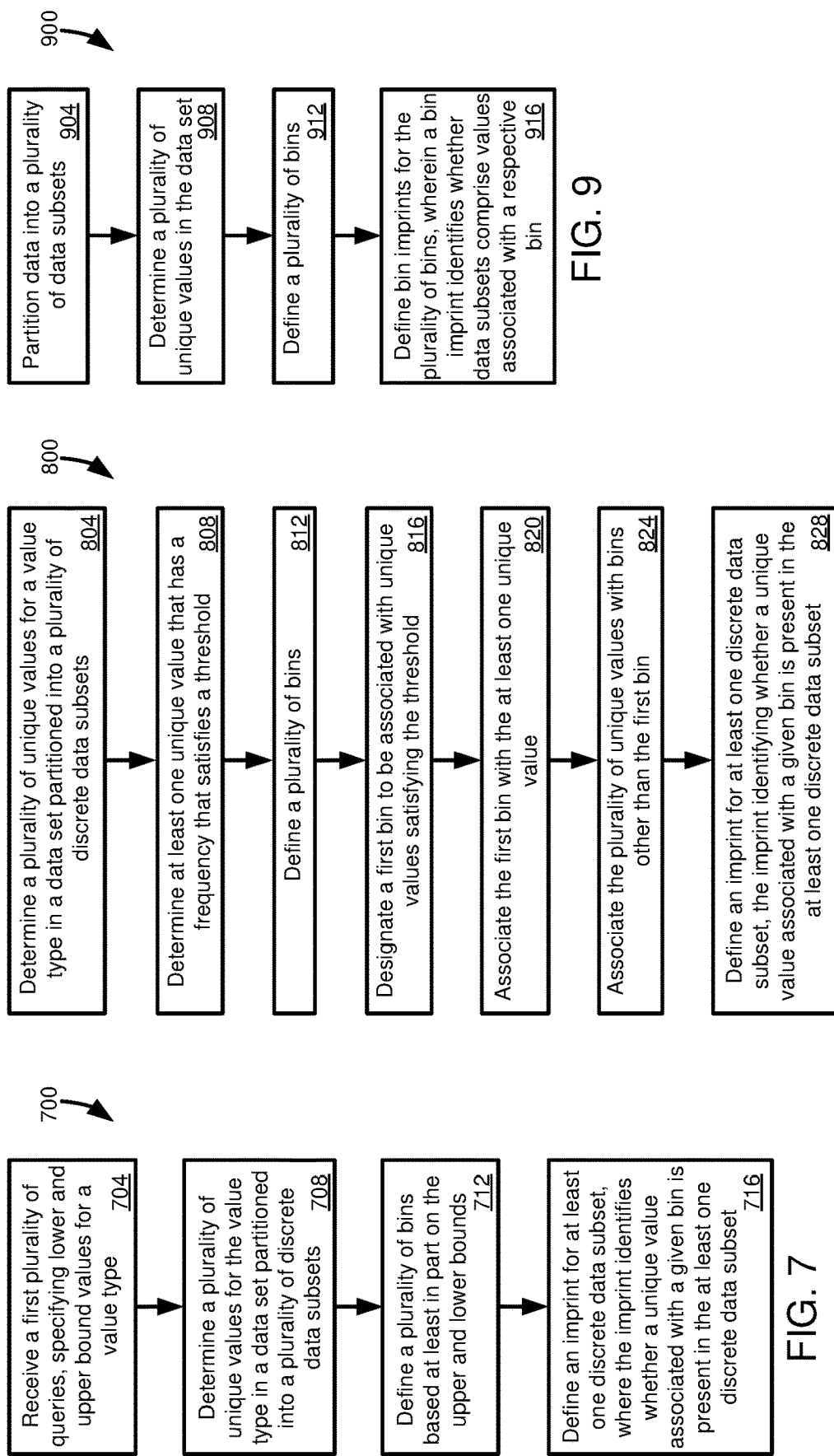

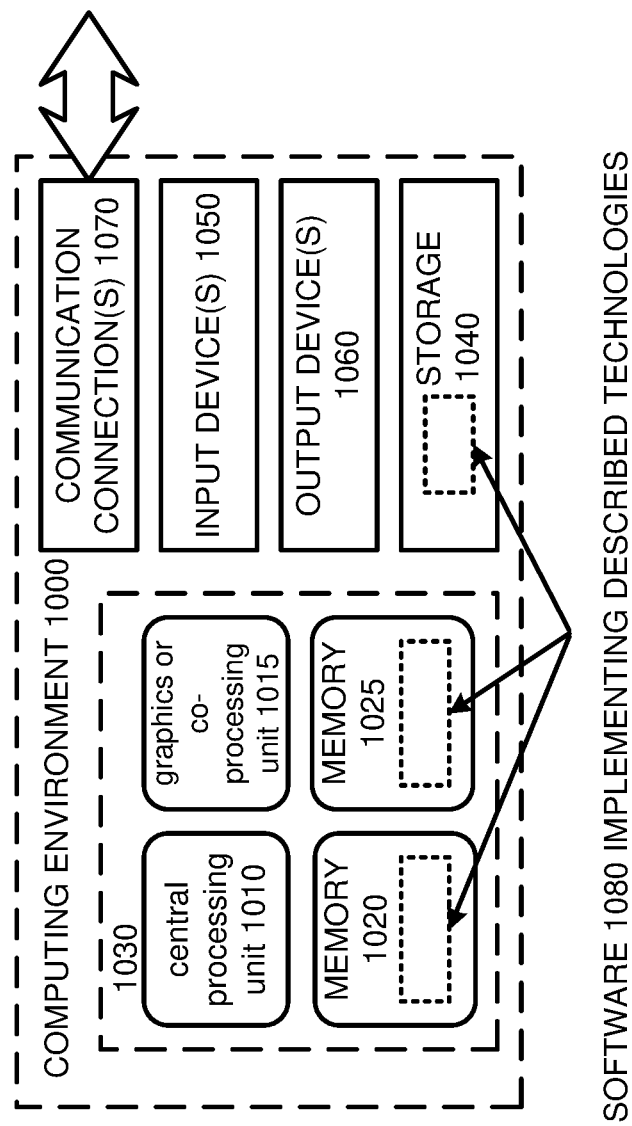

WORKLOAD-AWARE COLUMN IMPRINTS

CROSS-REFERENCE TO RELATED APPLICATIONS

This application is a continuation of, and incorporates by reference, U.S. application Ser. No. 16/880,730, filed May 21, 2020.

FIELD

The present disclosure generally relates to techniques for processing data, such as determining portions of a data set that may be relevant to a query. Particular implementations provide improved techniques for creating data imprints, where a data imprint can be compared with a query imprint to determine whether data having the data imprint may have information responsive to a query associated with the query imprint.

BACKGROUND

Software applications, particularly enterprise level software applications, often are desired to access enormous volumes of data. Processing and storing such data volumes can require large amounts of computing resources and time. Some systems, such as SAP HANA of SAP SE, of Walldorf, Germany, provide an in-memory database, where large volumes of data are maintained in RAM. Even though these in-memory databases can provide improved performance, data is typically transferred from memory to a CPU, such as to a cache of a CPU, for processing.

When a query is processed, data may be transferred from RAM to CPU cache for processing, such as to determine if the transferred data includes information that is responsive to the query. If the transferred data does not include data responsive to the query, the time and resources used to transfer data from main memory to cache, and to analyze the data with the CPU, can lead to inefficient use of computing resources.

Column imprints is a technique that has been used to try and facilitate query processing. Column imprints can divide a set of data into a number of smaller subsets. For example, the size of the subsets can correspond to the size of a cache line of data that is transferred from main memory to CPU cache. Column imprints for respective subsets in the column can summarize data present in that subset. An imprint can be in the form of a bit vector, where a given bit in the bit vector is set to one if a value within a particular range of values is present in the subset, and have a value of zero otherwise. A query can be represented as an imprint, also in the form of a bit vector. The imprint for a query can be compared with imprints for the subsets to determine subsets that should be transferred to cache and further processed. However, current techniques using column imprints can suffer from various drawbacks, including if a bit vector comparison indicates that a subset may have data responsive to a query, but it is determined after further processing the subset that the subset does not contain data responsive to the query. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described that can be used to determine data subsets of a data set that may be responsive to a query. In one aspect, imprints are created for the data subsets, where an imprint indicates whether, for a plurality of bins, a data subset contains values within respective bins. The bins are defined at least in part using data for a set of queries. In another aspect, at least one bin of a plurality of bins is designated to be associated with values of the data set satisfying a threshold frequency. In a further aspect, imprints are created for a plurality of bins, where an imprint indicates whether the plurality of data subsets comprise a value for a given bin. A query imprint can be compared with the data subset imprints or bin imprints to determine data subsets that may be responsive to an associated query.

In one aspect, the present disclosure provides a method for defining an imprint for a data set using bins defined at least in part on queries received for the data set. A plurality of first queries are received. Respective queries specify a lower bound value and an upper bound value for a value type. A plurality of unique values for the value type are determined. The data set is partitioned into a plurality of discrete subsets. A plurality of bins are defined based at least in part on upper bounds and lower bounds specified by the plurality of first queries. A given bin of the plurality of bins includes at least one unique value of the plurality of unique values. An imprint is defined for at least one discrete data subset of the plurality of data subsets. For each bin of the plurality of bins, the imprint identifies whether a unique value associated with a given bin is present in the at least one discrete data subset.

In another aspect, the present disclosure provides a method for defining bins for a data set, where a bin is designated to be associated with values exceeding a threshold frequency. A plurality of unique values are determined for a value type in a data set. The data set is partitioned into a plurality of discrete data subsets. At least one unique value is determined that has a frequency that satisfies a threshold. A plurality of bins are defined. A given bin of the plurality of bins includes at least one unique value of the plurality of unique values.

A first bin is designated to be associated with unique values satisfying the threshold. The first bin is associated with the at least one unique value. For at least unique values of the plurality of unique values other than the at least one unique value, the unique values are associated with bins of the plurality of bins other than the first bin. An imprint is defined for at least one discrete data subset of the plurality of discrete data subsets. For each bin of the plurality of bins, the imprint identifies whether a unique value associated with the given bin is present in the at least one discrete data subset.

In a further aspect, the present disclosure provides a method for defining bin imprints. A data set is partitioned into a plurality of data subsets. A plurality of unique values in the data set are determined. A plurality of bins are defined. Each bin of the plurality of bins is associated with at least one unique value of the plurality of unique values. Bin imprints for the plurality of bins are defined. A bin imprint identifies whether data subsets of the plurality of data subsets include values associated with the respective bin.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 2A and 2B present pseudocode for a process of determining bin boundaries for a histogram based on plurality of queries for a data set.

FIG. 3A-3F are diagrams illustrating a particular example of how the process of FIGS. 2A and 2B can be carried out.

FIG. 7 is a flowchart of an example method for defining histogram bins based on an example workload.

FIG. 8 is a flowchart of an example method for defining histogram bins to account for values in a data set satisfying a threshold frequency.

FIG. 9 is a flowchart of an example method for defining histogram bin imprints that reflect values present in a plurality of data subsets of a data set.

FIG. 10 is a diagram of an example computing system in which some described embodiments can be implemented.

DETAILED DESCRIPTION

Example 1—Overview

Figure 1:
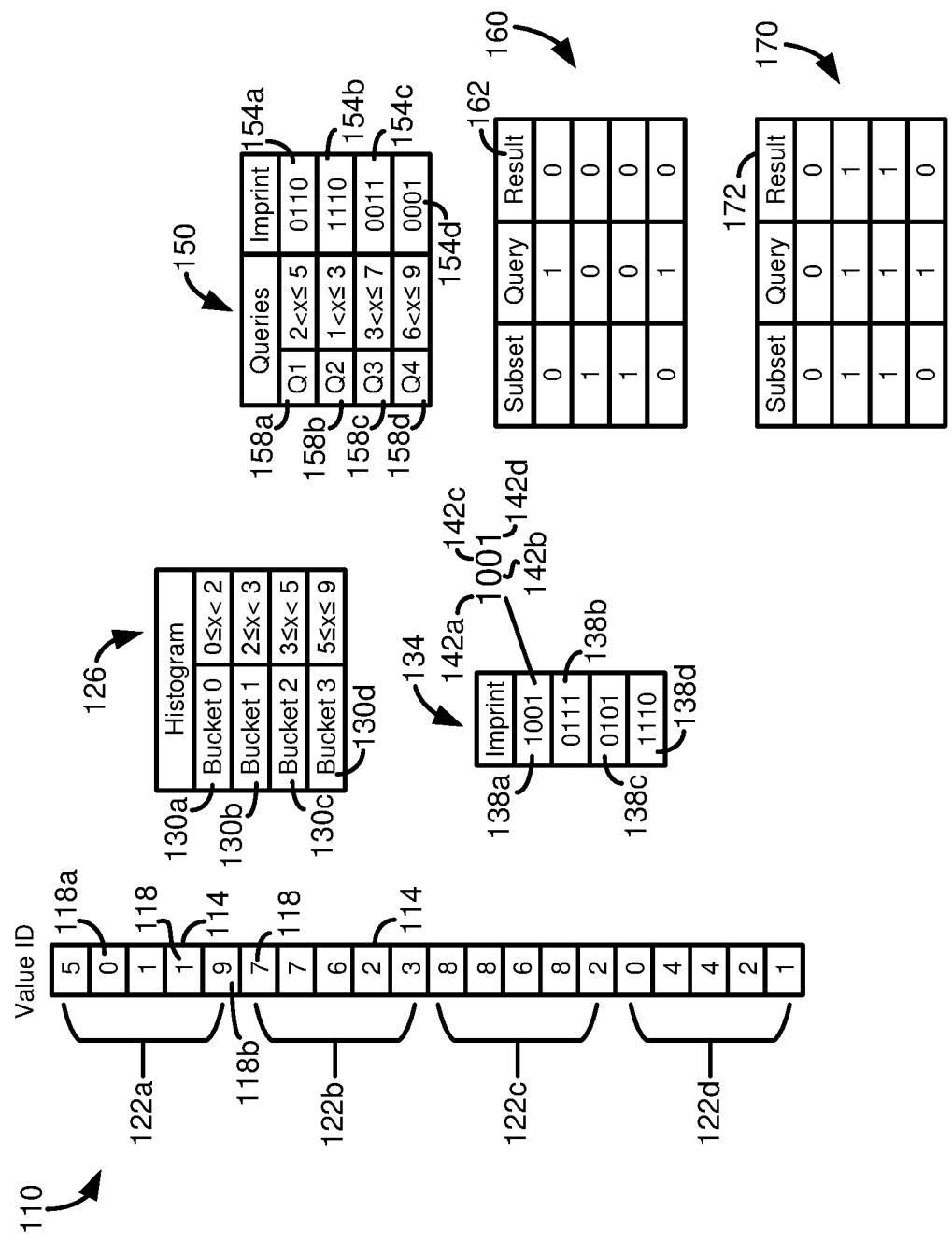
FIG. 1 is a diagram illustrating how imprints can be formed for data subsets of a data set, and for queries, using a histogram.

Software applications, particularly enterprise level software applications, often are desired to access enormous volumes of data. Processing and storing such data volumes can require large amounts of computing resources and time. Some systems, such as SAP HANA of SAP SE, of Walldorf, Germany, provide an in-memory database, where large volumes of data are maintained in RAM. Even though these in-memory databases can provide improved performance, data is typically transferred from memory to a CPU, such as to a cache of a CPU, for processing. Thus, it can be beneficial to limit data transferred to cache to that actually containing data responsive to the query.

When a query is processed, data may be transferred from RAM to CPU cache for processing, such as to determine if the transferred data includes information that is responsive to the query. If the transferred data does not include data responsive to the query, the time and resources used to transfer data from main memory to cache, and to analyze the data with the CPU, can lead to inefficient use of computing resources.

Column imprints have been proposed as a way of reducing the amount of data read in order to determine query results. In particular, a data set (which can be a subset of a larger data set), such as a column of a table, can be read in discrete units. The discrete units can correspond to the size of a data transfer unit used to transfer data between main memory and processor cache, which can be referred to as "cache lines." In the column imprints technique, values present in a column are grouped into bins or buckets. For a column having n bins, a bit vector of length n can be used to represent whether a given cache line of data contains a value corresponding to a particular bin. Assuming a column has m cache lines, m bit vectors, each of length n, can be used to represent data in the column. The n bits in bit vector can be set to one if a data line of data, or other partition, includes a value corresponding the associated bin, and set to, or left at, zero otherwise.

A query, such as a range query, can also be converted to an imprint (in the form of a bit vector of length n), which can be compared with a column imprint to determine if a value requested by the query may be present in a cache line of data represented by a column imprint. Range queries can include queries that request data between two endpoint values, such as a query that seeks values greater than and less than or equal to given values. An example range query can be $2 < x \leq 6$, where x represents values satisfying the query conditions. Comparing bit vectors can quickly determine whether a cache line corresponding to a particular column imprint should be loaded into the cache. A logical AND operation can be performed between the bit vector for the column imprint and the bit vector for the query. If a bit value of one is present in the result, then a value of interest to the query may be present in that cache line of data, and so the actual cache line of data should be transferred to the processor cache for further processing.

The use of column imprints can thus be useful in reducing data transfer between main memory and processor cache, and reducing CPU usage, since data that clearly does not satisfy the query is not transferred to the cache and processed. However, typical column imprint techniques can result in "false positives." Because bins represent multiple values, and a column imprint has a bit set to one if any of those multiple values is present in the cache line of data, it is possible that a cache line might be flagged as possibly having data needed for the query, but when the full cache line of data is processed it is determined that the value that caused the bit to be set to one was not a value requested by the query. The false positive scenario thus wastes computer resources.

According to one aspect, the present disclosure provides techniques that can provide improved column imprints by setting the size or boundaries of the bins used for bit vector construction to reduce the chance of false positives being encountered. The technique can analyze actual or hypothetical queries to determine values requested by the queries, including endpoints specified by the queries. Given a specified number of bins, the present disclosure provides techniques for determining the values to be placed in the bins, and the sizes of the bins. Thus, the technique can help provide a stronger correlation between an expected workload and the column imprints that are used to process the workload, which can reduce the frequency of false positives, and therefore make more efficient use of computing resources.

The rate of false positives can also be increased by particular values that occur frequently in a data set (e.g., a column) As even a single result bit vector with a bit set to one causes an entire cache line of data to be read, frequently occurring values can cause many cache lines to be read. Even if the cache line does include the value of interest, and therefore the result is technically not a false positive, the column imprint technique may still fail to provide a significant reduction in the number of cache lines being read.

According to another aspect of the present disclosure, bins used in the construction of bit vectors for cache lines and queries are constructed taking into account frequently occurring values. In a particular implementation, one bin can be reserved for frequently occurring values. For example, assume that a user wishes to create 8-bit bit vectors, thus using eight bins. Seven bins would be set using another technique or other criteria, and the $8^{th}$ bin would be used to indicate that the cache line includes a frequently occurring value.

Assuming a frequently occurring value is requested, the logical AND operation can still cause many cache lines to be read. However, assuming the query does not request a frequently occurring value, the column imprints are more likely to identify column imprints as not containing a value of interest. Assume that a value of four occurs frequently. A bin that contains values 1-4 would cause a query that requests values 1-3 to read all cache lines where a value of four occurs, even though four is not a value requested by the query. Including four as a frequently occurring value could result in a new bin definition that includes values 1-5. If a cache line includes the value four, the bit for the bin indicating a frequently occurring value can be set to one.

Bit vectors for queries can be constructed in a similar manner A query that requests a value of three would not result in the frequently occurring value bit being set, but a query that requests the value four would result in the frequently occurring value bit being set. The frequently occurring value bit for a column imprint need only be examined if the frequently occurring value bit is set for the query.

According a further aspect, the present disclosure provides techniques that can be used to reduce data transferred to cache in comparing a column imprint to a query imprint, and speed the identification of column imprints that match query criteria. Normally, a logical AND operation is performed between the query imprint and each column imprint. Assuming a column has 1000 column imprints, 1000 comparison operations would be needed, and the bit vectors for 1000 column imprints would need to be loaded into cache.

The present disclosure provides for bit vectors that are constructed on a bin-by-bin basis, rather than a partition-by-partition basis for partitions, or subsets, of a data set (e.g., a column). These bin-based bit vectors can also be referred to as imprint bit slices. Imprint bit slices are formed by creating an imprint bit slice bit vector for each bit position of the column imprint bit vector, where the length of the imprint bit slice vector is equal to the number of column imprints (or partitions), and the number of imprint bit slices is equal to the number of bins. Typically, the number of column imprints is larger than the number of bins in a column imprint.

A query can be evaluated by performing a logical OR operation between the imprint bit slice bit vectors that correspond to the bits in the query imprint that are set to one. The resulting bit vector from the OR operation indicates the column imprints whose corresponding cache lines should be transferred to the CPU cache and processed. In particular, this technique can reduce the number of bit vectors that are read and processed by the CPU in using a column imprint technique. This technique can also provide for compression, or more compression, than other techniques, can allow a number of bins to be created that are not related to a cache line size for a particular CPU architecture.

The above described techniques can be used alone or in combination. Workload aware bin definition can be used with or without the use of a bin to represent frequent values or imprint bit slices. The use of a bin to represent frequent values can be used with or without using imprint bit slices. Imprint bit slices can be used alone, or in combination with one or both of workload aware bin definition or a bin to represent frequently occurring values.

Example 2—Example Column Imprints

FIG. 1 illustrates how data imprints can be created for a data set, where a data imprint summarizes data present in the data set, or a subset thereof, and how these data imprints can be used in processing requests to retrieve or determine data present in the data set. In this Example 2, and the Examples which follow, disclosed techniques are described in the context of data corresponding to a column of data maintained in a column-store format (i.e., data for a table is stored on a column-by-column basis, for multiple rows of the column, rather than maintaining data in a row-by-row basis, as for row-store format).

FIG. 1 illustrates a column 110 of data that includes multiple positions, elements, or indices 114. Each position 114 can be associated with a value 118. In some cases, one or more positions 114 do not have values, or have a value (e.g., NULL) that represents that no specific value has been assigned to a given position. The values 118 can be actual data values for the column 110, or can be value IDs resulting from compressing data in the column, such as using dictionary compression.

The column 110 is shown as having the positions 114 organized into subsets 122 (shown as 122a-122d). The subsets 122 can be selected so that they have a fixed size, although the fixed size can vary depending upon implementation. For example, the size can be selected to match the size of a cache line for particular computing system—the size of data that is transferred between main memory (or other storage), such as RAM, and the cache of a processing unit (e.g., a CPU cache or a cache associated with a particular processing core of a CPU).

A subset 122 (or in some cases values 118 for an entire column 110) can be represented as an imprint. An imprint can be defined based on ranges of values that are present in the column 110. Typically, an imprint size is defined, where the imprint size defines the length of a bit vector for the column imprint. The values 118 in the column can be subdivided into a number of bins or buckets corresponding to the length of the bit vector.

For example, column 110 is shown as having values between zero and nine. Assuming that a bit vector of length four is desired, the values 118 can be divided into groups of four. In some cases, the sizes of the bins are equal (e.g., each contains the same number of values 118), while in other cases the bins can have different sizes. Typically, the values within a bin are contiguous, but in other cases values in a given bin need not be contiguous, but may be selected according to other criteria.

Table 126 illustrates a histogram for the values 118, where the values have been distributed among four buckets (or bins, which terms may be used interchangeably in the present disclosure) 130a-130d as shown. Table 134 illustrates imprints 138 (shown as 138a-138d) that can be created for the subsets 122 using the table 126. The imprints 138 are bit vectors, where each bit represents a bucket 130. For example, bit 142a corresponds to bucket 130a, bit 142b corresponds to bucket 130b, etc. When an imprint 138 is being defined, if a value 118 falls within the value range defined for a bucket 130, the corresponding bit 142 of the imprint is set to 1, and is left 0 otherwise. For subset 122a, the subset has the value 118a of 0, and so the bit 142a for imprint 138a is set to 1. The subset 122a does not include values within the ranges of buckets 130b, 130c, so the bits 142b, 142c of the imprint 138a are set to (or left at) 0. The subset 122a includes a value 118b of 9, which is in the range of bucket 130d, and so the bit 142d of the imprint 138a is set to 1.

Imprints can be created for queries in an analous manner to the imprints 138 of the table 134 using the histogram of the table 126. Table 150 provides imprints 154 (shown as 154a-154d) for queries 158 (shown as 158a-158d), in the form of bit vectors. Like the column imprints 138, the bit vectors for the query imprints have a length corresponding to the number of buckets 130 in the histogram of the table 126. If value 118 in a particular bucket 130 would be responsive to a query, the corresponding bit in the query imprint 154 is set to one, and zero otherwise.

Taking the query 158a, the query requests values greater than two and less than or equal to five. Thus, values 118 in buckets 130b, 130c would be responsive to the query 158a, but values in buckets 130a, 130d would not. So, the query imprint 154a for the query 158a is 0110.

As discussed above, it can be determined whether a column imprint 138 may have values that are responsive to a query by evaluating the result of a logical AND operation between the column imprint 138 and the query imprint 154. Take, for example, the query imprint 158a and the column imprint 138a. The logical AND operation is represented in table 160. A result column 162 has all bits set to zero, indicating that the subset 122a of the column 110 does not have values that are responsive to the query 158a.

Table 170 represents the logical AND operation between the query imprint 154a and the column imprint 138b for the subset 122b of the column 110. A result column 172 has two bits that are set to one, indicating that the subset 122b may contain values that are responsive to the query 158a. Thus, based on this analysis, it can be determined that data for the subset 122a need not be analyzed further, but data for the subset 122b should be analyzed further.

Example 3—Example Technique for Defining Histogram Bins and Column Imprints Based on an Example Workload As discussed in Example 1, the technique described in Example 2 of using column imprints to evaluate data subsets that should be analyzed as responsive to a search predicate can be beneficial, but this benefit can be reduced as the number of false positive results increases. The present disclosure provides for defining bucket boundaries in a way that better represents the type of queries that are made against a data set.

For example, take a column of data representing sales information, and a particular column of data represents a state in which a sale was made. It may be that some states (e.g., large states such as California) may be more commonly searched than other states (e.g., smaller states, or less populated states, such as Rhode Island or North Dakota). Or, it may be that some groups of states (e.g., west coast states versus east coast states) tend to be requested in common queries. Defining histogram buckets that better reflect search parameters can make it more likely that a bucket associated with a positive result when conducting the logical AND operation will actually contain a value requested by the query, thus reducing the incidence of false positives, and reducing data transfer, cache use, and CPU processing time used to execute a query.

The disclosed technique can be referred to as "workload aware histograms," since histograms are constructed based on a workload. The workload can be a predicted or simulated workload, or can be an actual workload, such as by tracking queries made over a period of time. Note that different histograms can be used for different queries/use cases, even with the same data. For example, different histograms can be used with different software applications, different users, etc., based on a predicted or observed workload for that application or user. Histograms can thus be tailored to provide improved performance for different types of workloads.

FIGS. 2A and 2B illustrate pseudocode for an example process 200 of defining buckets based on a workload. The process 200 uses as input one or more (and typically a plurality) of queries, a number of buckets in which values are desired to be placed, values in the data set being divided into buckets, and a weight for each value. The weights can be determined using various criteria, such as a number of queries that request a value, a number of times a value occurs in a data set, a user-provided weighting value, other values, or a combination of two or more of these types of weights.

The process 200 generally proceeds by determining, for each value in the domain (set of unique values for values in the data set) of the data set that serve as an endpoint for at least one query (or, at least for values other than a first or last value in the set of values that serve as endpoints), a cost of placing a left bin boundary at the endpoint value (routine 210) and a cost of placing a right bin boundary at the endpoint value (routine 220). For each endpoint value, routine 230 calculates a total cost of placing a bin boundary at a given endpoint value. Routine 240 selects the endpoint value having the lowest total cost as a bin boundary. The selected endpoint value is indicated as being a bin boundary, and this indication is taken into account when selecting other bin boundaries. The process 200 is repeated until the total number of bins has been defined.

Figure 3A:
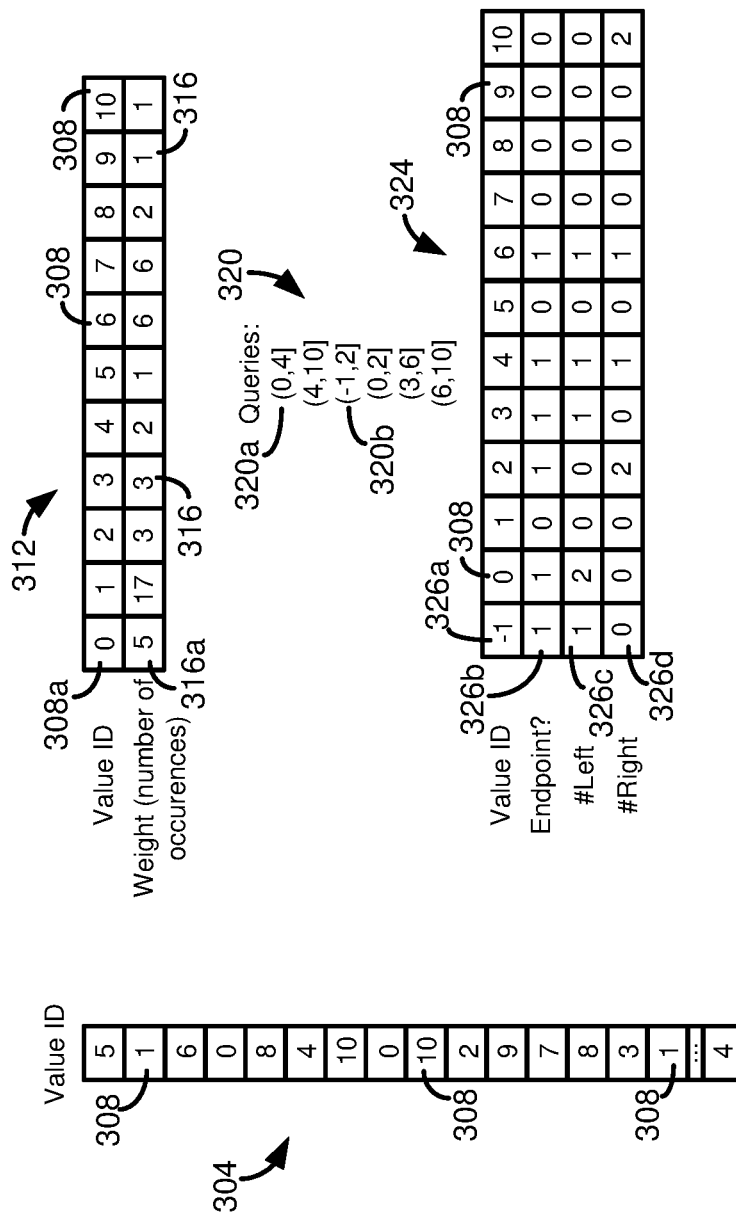

The process 200 is further illustrated in the diagrams of FIGS. 3A-3F. FIG. 3A illustrates a data set 304, which can represent a column of data in a database. The data set 304 has a number of values 308, which are selected, or constrained to, particular values (e.g., the domain of the data set). The number of unique values in the data set 304 (or in the domain of the data set) can be referred to as the cardinality of the data set. Although the values are shown as integers, the values can be other types of data, including data types used by a computing system. The data types can be primitive data types, or can be instances of abstract or composite data types. In particular examples, the values 308 can be integers, but can be value IDs that represent other data, which may also be integers or can be other types of data, such as character arrays, strings, and the like. For example, the value "0" may represent a particular country, state, product, etc., that has a number, character string, etc. The values can be assigned during dictionary compression of a data set from which the data set 304 was created, and to which the data set 304 otherwise corresponds.

In some cases, data used in a data set is constrained to set values. For example, there are a set number of states in the United States, and a value ID can be used to represent each state. However, value IDs also can be assigned to values that not constrained to set values. When a new value is provided to an uncompressed dataset, a value ID can be assigned to that value in a dictionary that maps values to value IDs.

In the specific example of FIG. 3A, the data set 304 includes eleven unique values, 0-10. A table 312 assigns a weight 316 to each value 308. The weight 316 can be determined in various manners, including based on a number of occurrences of a value 308 in the data set 304. As shown, it was determined that value ID 308a, value 0, occurs five times in the data set 304, giving it a weight 316a of five (note only a portion of the data set 304 is shown in FIG. 3A for ease of presentation).

FIG. 3A illustrates a plurality of range queries 320 that may have been previously submitted to a data store (e.g., a relational database management system) that includes the data set 304. Parenthesis represent that an endpoint (e.g., a minimum value for the range or a maximum value for the range) should not be included in a query result, and brackets represent that an endpoint should be included in a query result. So, the query 320a, for example, requests vales that are greater than zero, and less or equal to four. Note that a query, such as query 320b, can include an endpoint that is not a value 308 in the dataset 304. In some cases, such as for query 320b, a particular value, such as −1, can indicate that a lowest value in the data set 304 should be included in query results, which can be useful in cases where it is not permitted to have a minimum value specified using a greater than or equal to operator (e.g., brackets are not available for the lower bound of the query). The present disclosure uses the term left endpoint to refer to the minimum value (or a smallest value which query results must be greater than) for a query 320 (e.g., 0 for query 320a), and right endpoint to refer to the maximum value in a query 320 (e.g., 4, for query 320a).

Table 324 illustrates one way of indicating what queries 320 use particular values 308 (or value IDs) as endpoints. Row 326a lists values 308. Row 326b provides a value, such as a Boolean value (such as using 0 for false, and 1 for true), indicating whether a given value 308 in the row 326a serves as an endpoint, left or right, in any query of a group of queries being analyzed (and summarized in the table 324). Row 326c indicates a number of queries for which a given value 308 in the row 326a serves as a left endpoint, and row 326d indicates a number of queries for which a given value serves as a right endpoint. Taking value 308a, it can be seen that the value of 0 is an endpoint of a query, and serves as the left endpoint in two queries, but does not serve as the right endpoint for any query.

Figure 3B:
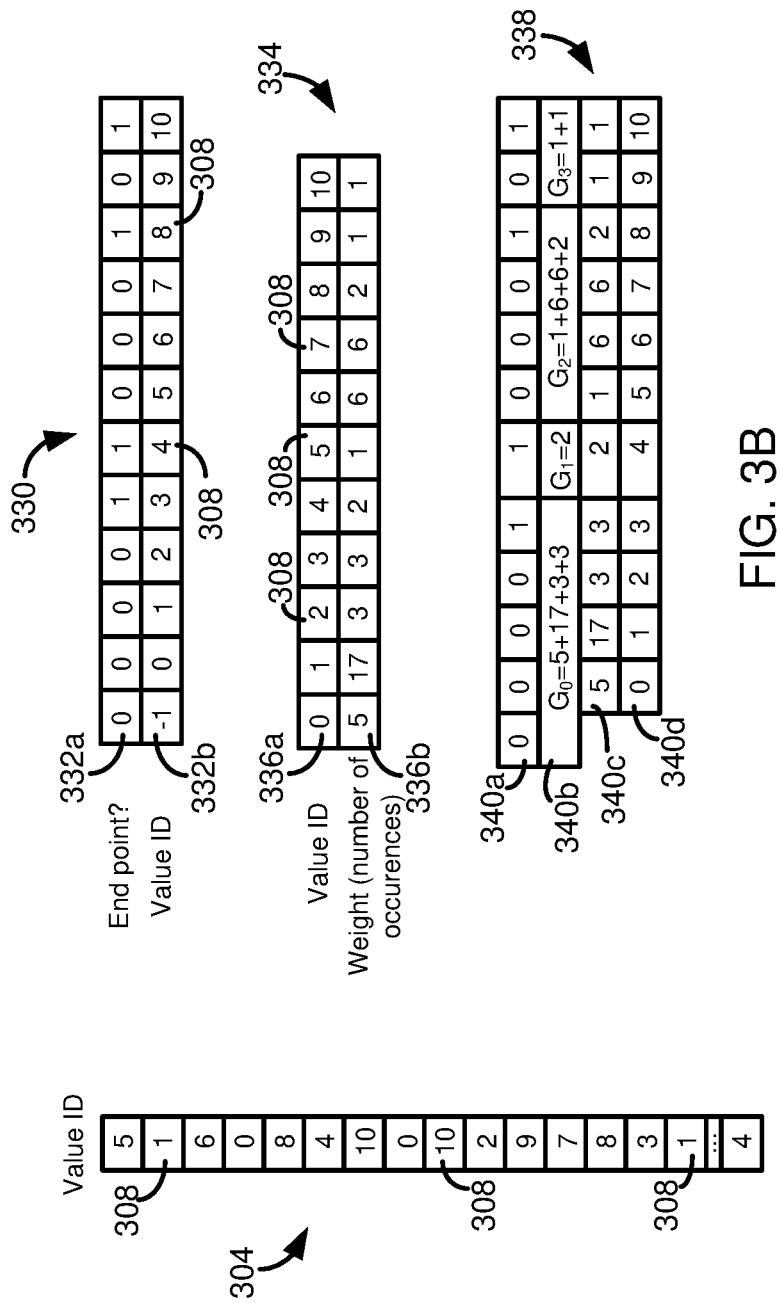

Turning to FIG. 3B, a table 330 has rows 332a, 332b that correspond to rows 326b and 326a of the table 324. A table 334 has a row 336a that corresponds to the row 326a and a row 336b that provides a weight for a given value in the row 336a.

A table 338 illustrates one way of representing how histogram buckets can be defined for discrete values 308 of the data set 304, including having a row 340d that provides the relevant, discrete values 308. A row 340c corresponds to the value weights in the row 336b of the table 334. A row 340a indicates whether a given value in the row 340d serves as an endpoint for a histogram bucket, with a value of 1 indicating that the value is an endpoint, and a value of 0 indicating that the value is not an endpoint. A row 340b illustrates a weight of gaps, where a gap is a collection of value IDs between endpoints, and is calculated as the weight in the row 340c of the values 308 within a given gap (or histogram bucket). Thus, according to row 340b, a first gap, $g_0$, includes values 308 0-3, and corresponds to a first bucket, a second gap/bucket includes only value 4, a third gap/bucket incues values 5-8, and a fourth gap/bucket includes values 9 and 10. Note that the buckets defined by the histogram represented by the table 338 are not the same size, and thus there are not an equal number of values 308 between each bucket endpoint (e.g., the gaps are unequal in size).

Figure 3C:
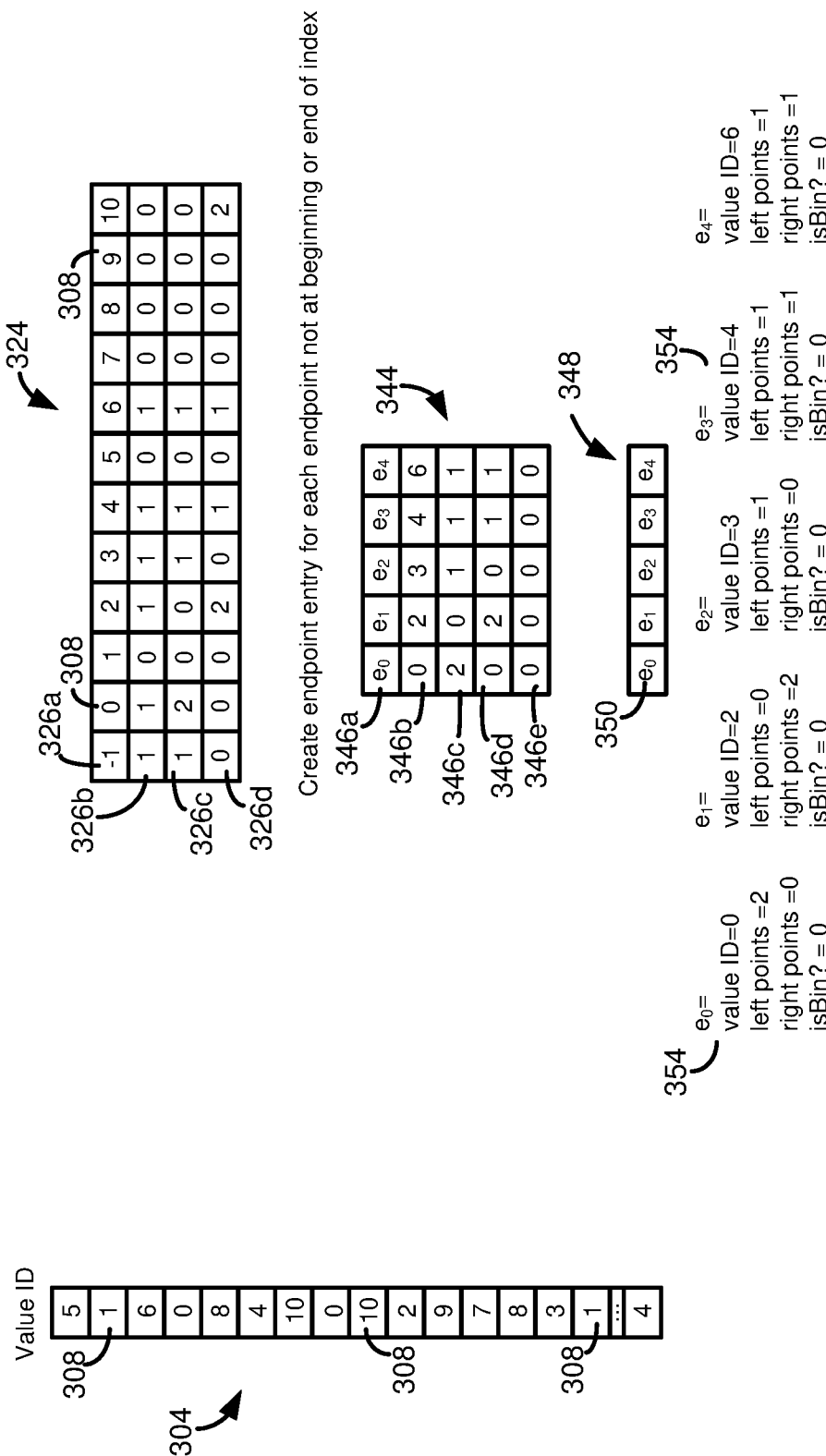

In the process 200 values 308 that serve as endpoints are evaluated for use in defining histogram buckets. FIG. 3C includes the table 324, and also illustrates a table 344 that can be constructed using information from the table 324. The table 344 includes a row 346a assigning a sequential endpoint number to each value 308 in a row 346b, where the values in the row 346b are only those that serve as endpoints for at least one query. Note that the value of −1 is included in the row 326a of table 324, but is not included in the row 346b, since it does not correspond to a value 308. Rows 346c, 346d indicate a number of queries for which a given value of the row 346b serves as a left endpoint or a right endpoint, respectively. Row 346e provides Boolean values indicating whether a given endpoint of the row 346a currently serves as a bin boundary (1) or not (0).

The endpoints in the row 346a of the table 344 can be defined (shown in endpoint definitions 354) as including the information in the other rows 346b-346e of the table 344. The endpoints can be defined as instances of abstract or composite data types that include the information in the rows 346b-346e as values for data members of such abstract or composite data types. Using this representation, the table 344 can be represented as table 348, which includes a single row 350 of endpoint identifiers.

Figure 3E:
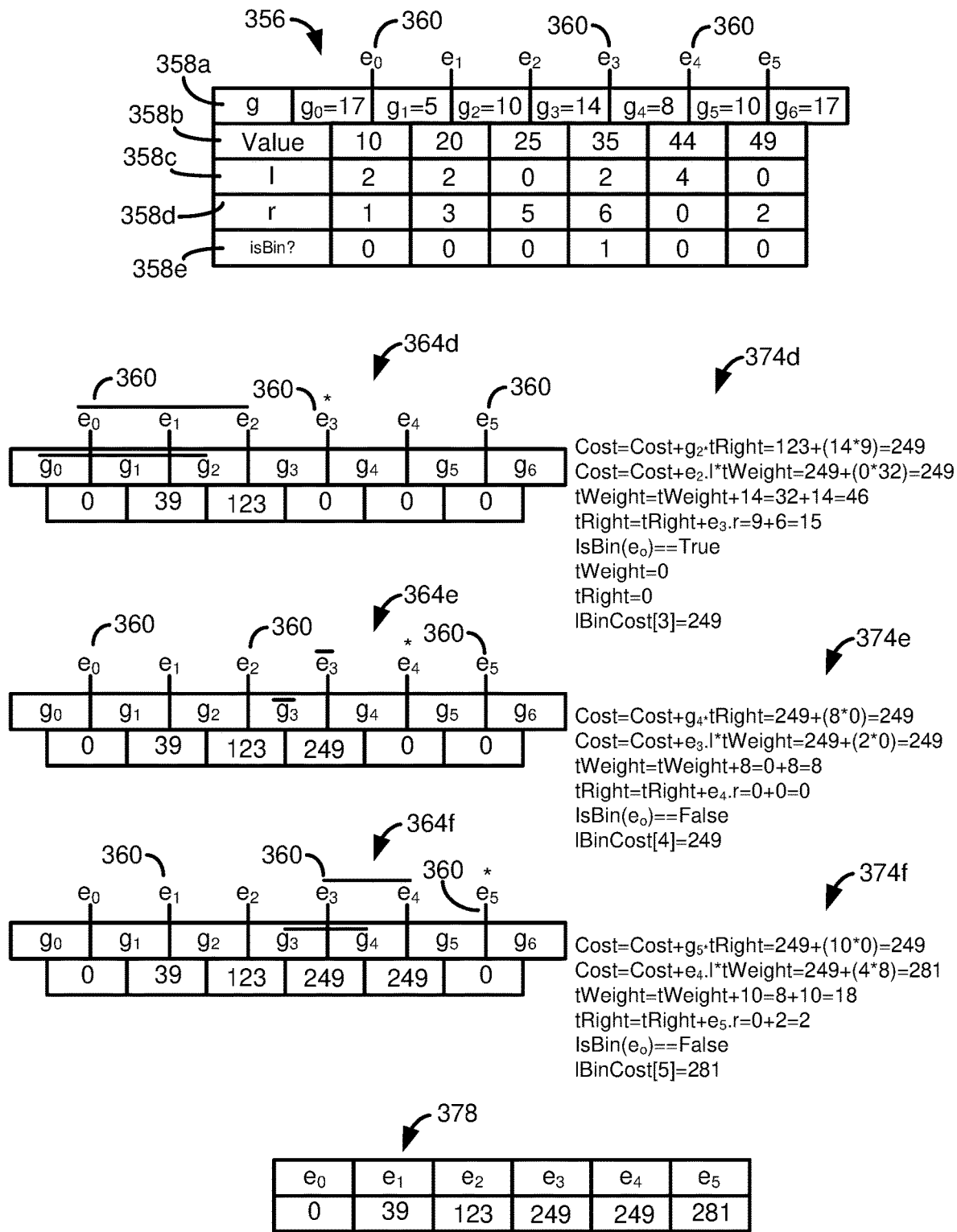
Figure 3F:
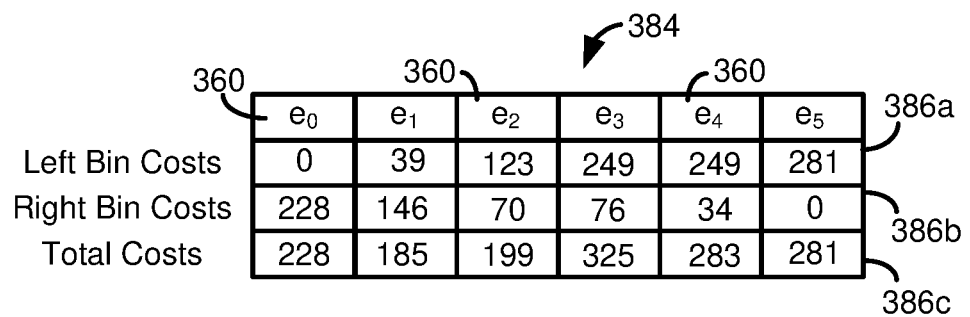

FIGS. 3D-3F illustrate a particular example of how the process 200 can be implemented. The routine 210 for determining left costs for a single bin placement step is described in detail with respect to FIGS. 3D and 3E. The process for determining additional costs for subsequent iterations, and for determining right costs using the routine 220, can be carried out in an analogous manner FIG. 3F illustrates how a value 308 can be designated as a bin boundary using the left and right costs determined using the routines 210, 220.

FIG. 3D illustrates a table 356 that summarizes endpoint information used in carrying out the routine 210 (and which also would be used in carrying out the routine 220, although that process is not described in detail). The table 356 includes a row 358a that summarizes weights for gaps between endpoints 360. The weights can be calculated as discussed in conjunction with the table 338 of FIG. 3B. The table 356 also includes a row 358b that includes values (e.g., value IDs) associated with a given endpoint 360, rows 358c, 358d that provide, respectively, a number of queries for which the endpoint 360 serves as a left endpoint or a right endpoint, and a row 358e that provides a Boolean value indicating whether a given endpoint 360 currently is set as a bucket (or bin) boundary. Rows 358b-358e can be analogous to the corresponding rows 346a-346e of the table 344 of FIG. 3C. Note that the values in the table 356, used in the detailed example of carrying out the routine 210, are different than the values in the table 344.

Tables 364a-364f illustrate an iteration to determine left costs in the routine 210, which will be combined with right costs to produce a total cost, which will then be used to assign a bin boundary to one of the endpoints 360. The value for the row 358e is then updated to reflect that the selected endpoint 360 is a bin boundary. The process 200 can then be repeated until the desired number of bin boundaries have been placed.

Each table 364 includes identifiers for the endpoints 360, a row 366a identifying a gap between adjacent endpoints, and a row 366b that is an array or vector used to track the weights of a respective endpoint 360 in the row 366a. An indicator 368a (the asterisk) indicates a current endpoint 360 under evaluation. Indicators 368b, 368c (the bars) indicate, respectively, endpoints 360 used in calculating the tRight variable of the routine 210 (line 234) and gaps 370 used in calculating the tWeight variable of the routine 210 (line 232). As described at line 236, tRight and tWeight are reset to zero if an endpoint 360 being evaluated has a value of 1 (true) in the row 358e indicating whether an endpoint is currently marked as a bin boundary.

Each table 364 is associated with respective calculations 374 (shown as 347a-374f) illustrating how steps 238-250 are carried out for each endpoint 360. Starting with table 364a and calculation 374a, the routine 210 starts by evaluating the first endpoint 360, endpoint $e_0$. Since tRight and tWeight are initially zero, lines 238 and 240 indicate that these variables do not contribute to an increase in the Cost variable, which remains at zero. Evaluating line 242, the gap weight, 17, for gap $g_0$ is added to tWeight, which gives tWeight a value of 17. Using line 244, the number of queries for which $e_0$ is a right endpoint, 1, is added to tRight, giving tRight a value of 1. Evaluating line 246, isBin? for $e_0$ is 0, so line 246 does not indicate any action that should be taken. The left bin cost for $e_0$ is set to the current value of Cost, 0, making the left bin cost for $e_0$=0. The routine 210 then indicates that the steps 238-250 should be carried out for the next endpoint, $e_1$.

Turning to the table 364b and the calculations 374b, according the line 238, the current value of Cost (0) is added to the current value of tRight (1) multiplied by the gap weight for $g_1$ (5), providing an updated Cost value of 5. According to line 240, an updated Cost is determined by adding the current Cost value of 5 to the product of the number of left endpoints for the prior endpoint ($e_0$), 2, and the current value of tWeight, 17, to provide an updated Cost of 39. An updated value for tWeight is determined according to line 242 by adding the current value of tWeight, 17, to the gap weight of $g_1$, 5, to provide an updated value of 22. The value of tRight is then updated according to line 244 by adding the current value of tRight, 1, to the number of queries for which $e_1$ serves as a right endpoint, 3, for an updated tRight value of 4. Since $e_1$ is not currently designated as a bin, line 246 indicates that no action should be taken, line 248 indicates that the left bin cost for endpoint $e_1$ is the current Cost value, 39, and the routine 210 is then repeated for the next endpoint, $e_2$.

Turning next to the table 364c and the calculations 374c, the indicators 368b, 368c indicate that the left bin costs for $e_2$ are influenced by the costs for $g_0$ and $g_1$, and costs associated with $e_0$ and $e_1$. These costs, included in tRight and tWeight, continue to increase as additional gaps and endpoints are evaluated without an endpoint being designated as a bin boundary.

The value of Cost is updated according to line 238 by adding the product of the gap weight for $g_2$, 10, and the current value of tRight, 4, to the current Cost of 39 to provide an updated cost of 79. Cost is then increased according to line 240 by adding the product of tWeight, 22, and the number of left endpoints associated with endpoint $e_1$, 2, to the current value of Cost, to provide an updated Cost of 123. The value of tWeight is updated according to line 242 by adding the gap weight of $g_2$, 10, to the current value of tWeight, 22, to provide an updated tWeight value of 32. The value of tRight is updated according to line 244 by adding the number of right endpoints for $e_2$, 5, to the current value of tRight, 4, to provide an updated tRight value of 9. Since $e_2$ is not designated as a bin boundary, line 246 indicates that no action should be taken, line 248 indicates that the current value of cost, 123, should be assigned as the left cost for endpoint $e_2$, and the routine 210 continues by evaluating $e_3$.

Turning now to FIG. 3E, Cost is updated according to line 238 by adding to the current value of Cost, 123, the product of tRight, 9, and the gap weight for $g_3$, 14, to provide an updated cost of 249. Line 240 then indicates that Cost should be updated by adding to the current value of Cost, 249, the product of the number of left endpoints for $e_2$, 0, and tWeight, 32, which leaves the Cost at 249. The values of tWeight and tRight are updated to 46 and 15, respectively, according to lines 242, 244. In this case, line 246 evaluates to True, since $e_3$ is currently designated as a bin boundary. Thus, tWeight and tRight are both reset to 0. The current Cost, 249, is assigned as the left cost for $g_3$, according to line 248.

The routine 210 then proceeds to evaluate to $e_4$ and $e_5$ in an analogous manner to the process described above, as shown and described with respect to tables 364e, 364f and calculations 374e, 374f. After evaluating all of the endpoints, the left bin costs for respective endpoints 360 are as shown in table 378.

The routine 220 can be carried out in a similar manner as described above for the routine 210. FIG. 3F illustrates a table 384 that lists the left bin costs 386a, right bin costs 386b, and total costs 386c for each of the endpoints 360. From the table 384, it can be seen that endpoint $e_1$ has the lowest total cost. Endpoint $e_1$ can thus be identified as a bin boundary, and its isBin? value in row 358e can be updated to 1. Assuming that four bins, or buckets, are desired, the routines 210, 220 would be carried out an additional time to determine a third bin boundary, in addition to $e_1$ and $e_3$. The three bin boundaries, along with the natural boundaries provided by the first and last values in the set of unique values in the data set provide a total of four bins.

Example 4—Example Histogram Bin Definition Accounting for Values in a Dataset Satisfying a Threshold Frequency As explained in Example 1, issues can arise with the use of column imprints when a column contains one or more frequently occurring values. Since it is likely that the frequently occurring values occur in multiple column data segments, column imprints for those segments are less likely to provide a negative result, meaning that a larger number of column data segments will be read. Even if those column data segments include a value of interest, the column imprints may not reduce the number of column segments transferred and processed to a desired degree.

This Example 4 describes a technique that can be used to adjust the definitions of buckets in a histogram to account for frequently occurring values, which can make the column imprints more useful for queries that do not request a frequently occurring value. The technique of this Example 4 can be used with other technologies described in the present disclosure, including the technique for bucket boundary definition based on a workload as described in Example 3. However, the technique of this Example 4 can be used in other contexts, including where buckets are defined in a different manner, including when buckets are evenly distributed for values that occur in a data set (e.g., dividing a set of 40 values into 0-9, 10-19, 20-29, and 30-39).

Figure 4:
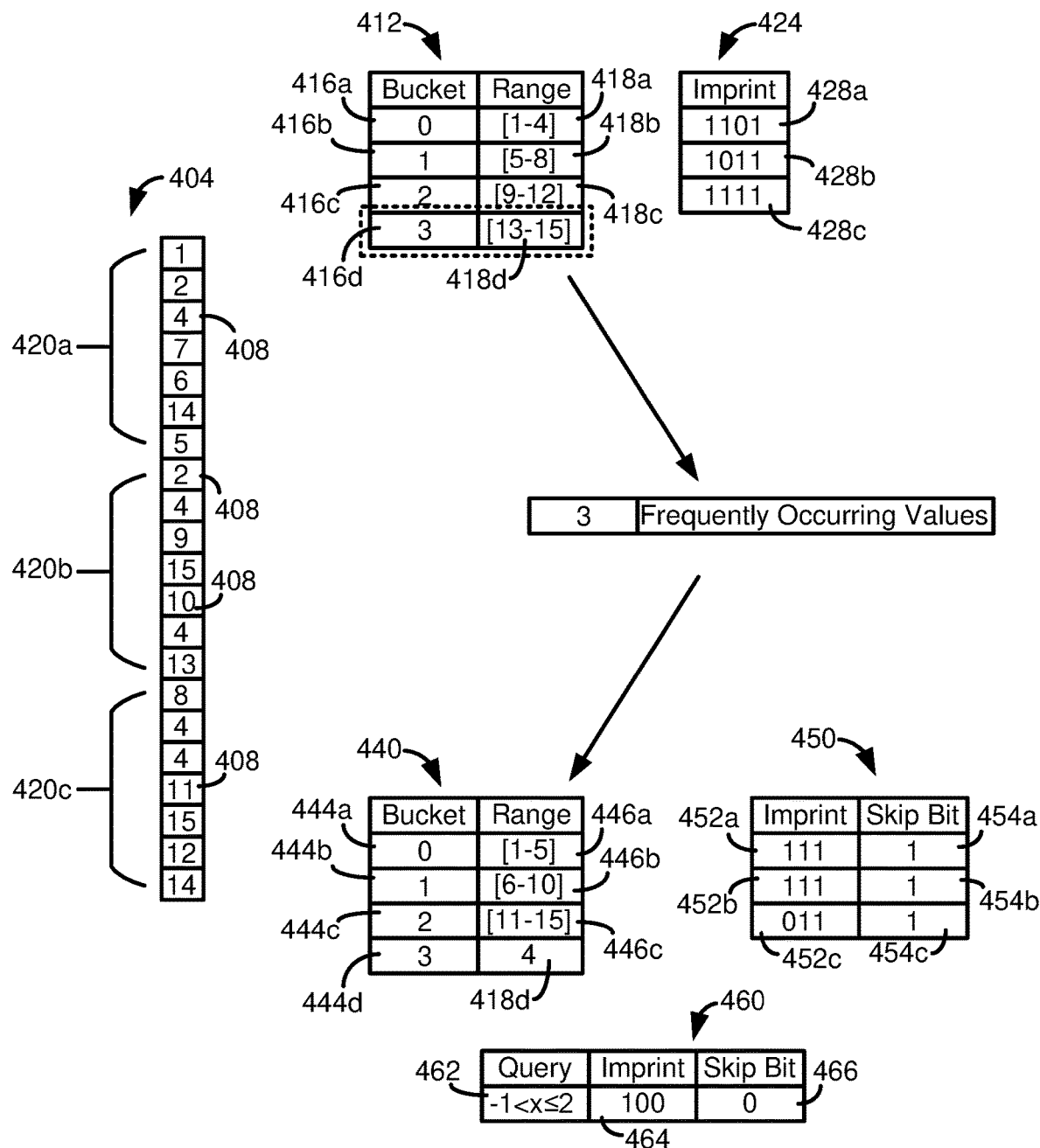
FIG. 4 is a diagram illustrating how bins for a histogram can be defined to account for values that occur frequently in a data set.

FIG. 4 illustrates a column of data 404, having a plurality of values 408. The values 408 include a set of discrete values, where a given discrete value may occur multiple times in the column of data. The number of discrete values 408 in the column of data 404 can be referred to as the cardinality of the column. In the data shown, the unique values are 1-15.

In a column imprint technique, the unique values can be used to define the ranges of buckets in a histogram, including by evenly distributing the unique values among the buckets, using a workload-aware technique such as described in Example 3, or using some other methodology. For illustrative purposes, FIG. 4 illustrates a table 412 that includes four buckets 416 (shown as 416a-416d) and definitions 418 (shown as 418a-418d) of the values 408 that are associated with a given bucket. Buckets 416a-416c each include four unique values, while bucket 416d include three unique values. Thus, it can be seen that buckets 416 can differ in the number of unique values associated with a bucket. In the table 412, the buckets 416 are defined using consecutive values. However, buckets 416 can be defined with one or more, including all, values that are not consecutive.

For the purposes of this Example 4, assume that the column of data 404 is to be read in units of seven values 408 (e.g., if a cache line size was equal to seven). This criteria results in data subsets 420a-420c, which in turn can be associated with respective bit vectors 428a-428c in a table 424. The bit vectors 428 can be constructed as explained in Examples 1-3. Since the histogram includes four buckets 416, the bit vectors 428 include four bits.

According to this Example 4, the buckets 416 can be redefined to account for values 408 having particular characteristics, such as being frequently occurring. However, other criteria can be used for determining one or more values 408 to be included in a bucket 426 using criteria other than criteria used for determining values 408 to be included in other buckets (e.g., based on a fixed number of values per bucket, using workload criteria to define bucket boundaries between consecutive unique values, etc.).

For purposes of this discussion, a bucket whose member or members are selected using different criteria than criteria used for other buckets is referred to as a target bucket, and the selection criteria can be referred to as target selection criteria. Values to be placed in the target bucket can be manually selected (e.g., based on user input), or can be selected based on particular rules or other target selection criteria. For example, values 408 that occur a threshold number of times in the column of data 404 can be automatically selected for the target bucket. Or, values 408 which are requested in at least a threshold number of queries can be included in a target bucket. Other target selection criteria can be used without departing from the scope of the present disclosure.

For a specified number of buckets, one bucket is designated as the target bucket, and the other buckets can be defined according to other criteria. In the example of FIG. 4, assuming that four buckets are desired, one bucket can be designated as the target bucket, and the unique values can be distributed amongst the other buckets. This process can be equivalent to converting bucket 416d to the target bucket, and distributing the unique values among buckets 416a-416c.

A result of this process is illustrated in table 440, which has buckets 444a-444d, and associated values 408/value ranges 446a-446d. Bucket 444d is the target bucket, and in this case is reserved for frequently occurring values. If "4" is determined to be the sole frequently occurring value, it is placed in bucket 444d. The remaining buckets 444a-444c contain the other values 408 and are defined according to other criteria (e.g., evenly distributed, using a workload to define bucket boundaries, etc.). Note that the value range 448a for bucket 444a, having a range of 1-5, includes the value of 4, even though 4 is also assigned to bucket 444d. In a bit vector, a bit corresponding to bucket 444d can be referred to as a skip bit, as evaluation of the skip bit can obviate further evaluation of a query imprint (i.e., if both a query and a data subset imprint have their skip bits set to 1).

Imprints, in the form of bit vectors 452a-452d and skip bit values 454a-454d, shown in table 450, can be constructed for the data subsets 420a-420c. When setting the bits in the bit vectors 452, the fourth bit, corresponding to bucket 444d, the target bucket, is set to 1 if a data subset includes a frequently occurring value, in this case 4. If so, the remaining bits, for buckets 444a-444c are set assuming that the frequently occurring value has been eliminated from the data subset. For example, assume a data subset, such as data subset 420a, includes values of 2 and 4. The value of 4 would result in the fourth bit being set to 1, and the value of 2 would result in the first bit being set to one, as shown in bit vector 452a. Taking the example of a data subset that only includes the value 4, and no values in the range 1-5, such as data subset 420c, the fourth bit would be set to 1, but the first bit would be left at 0, as in the bit vector 452c.

Bit vectors for queries can be constructed in a similar manner as described for the bit vectors 452. Query 462, in table 460, requests values between 0 and 2. Since query 462 does not request the frequent value of 4, its skip bit 466, is set to 0. Based on the definitions for the buckets 444a-444c, the imprint for the query is 100. When evaluating the query 462, since the skip bit 466 is not 1, the skip bits 454a-454c of the data subsets 420a-420c need not be evaluated. A logical AND operation can be performed between the bit vectors 452a-452c and the bit vector 464. This evaluation indicates that data subset 420c can be skipped/not transferred to cache/evaluated.

Example 5—Example Histogram Bin Imprints Defined with Respect to a Plurality of Data Subsets As described in Examples 1-4, bit vectors for column or query imprints are typically stored on a partition-by-partition basis (e.g., for individual data subsets of a column, where a data subset can correspond to a cache line of data), where the bit vector is equal in length to the number of buckets in a histogram used to construct the bit vectors. The process of evaluating data subsets that may be responsive to a query typically involves executing a logical AND operation for the imprint of each data subset and the query imprint. This approach can have some drawbacks.

For selective queries, it may be that only a limited number of data subsets include data that is responsive to the query. Thus, AND operations and evaluations may be performed for many data subsets that do not have data responsive to the query. In addition, the size of buckets used for a histogram is often tied to the cache line size for a particular CPU architecture, which can limit the number of buckets that can be created, and can produce more limited selectivity than if more buckets were created. In addition, constructing bit vectors on a partition-by-partition basis can limit the application of compression techniques that might otherwise be used. This Example 5 provides techniques that may address these issues.

Figure 5:
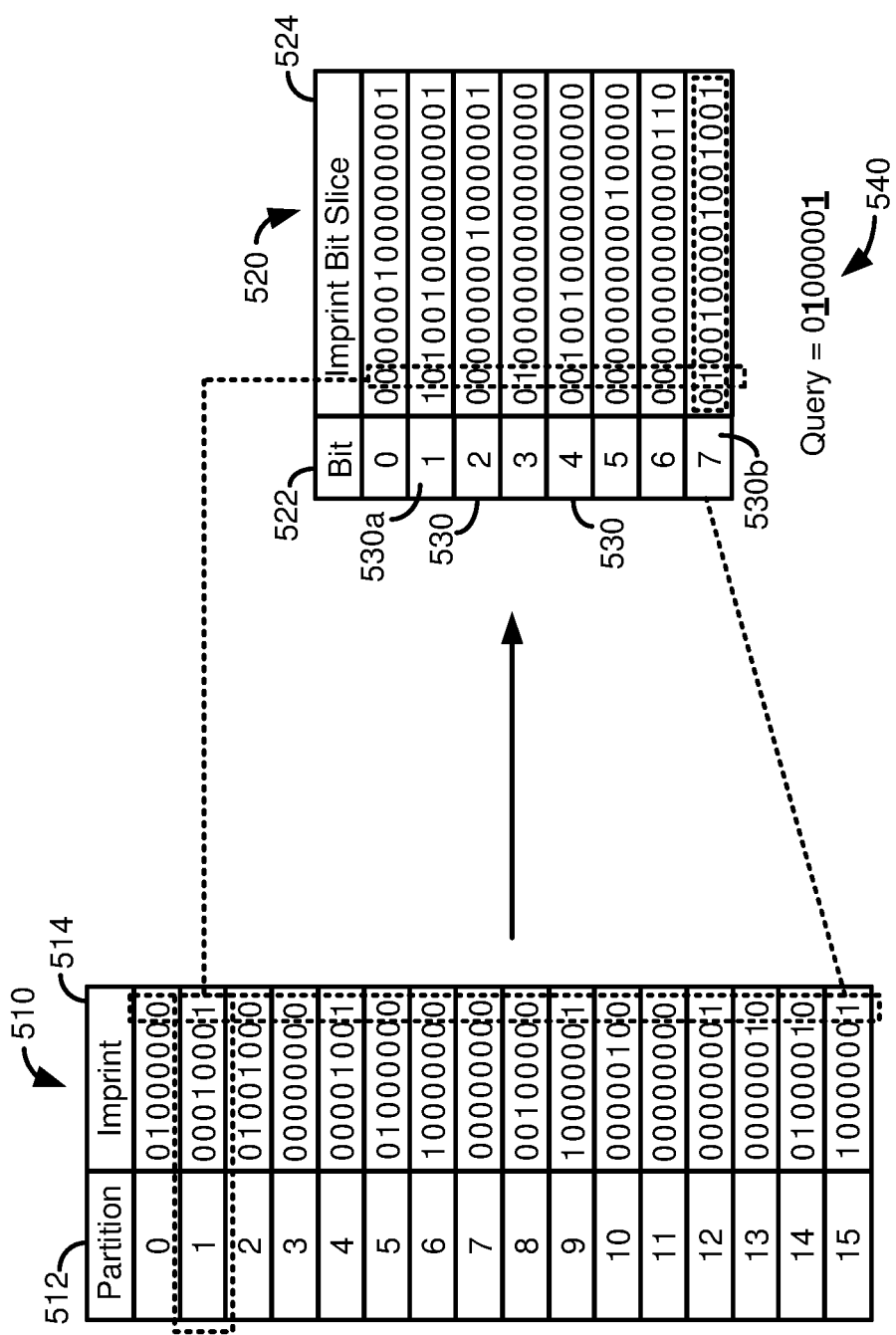
FIG. 5 is a diagram illustrating how imprints can be created for bins of a histogram based on data for a plurality of data subsets.

In particular, this Example 5 provides for creating bit vectors on a bucket-by-bucket basis for buckets of a histogram, where the length of such bit vectors can be equal to the number of data subsets. FIG. 5 illustrates this procedure. A table 510 includes a column 512 whose values represent data subsets, or partitions, of a data set (e.g., a column) and a column 514 that provides the imprints for the data subsets, in the form of a bit vector. The length of the bit vector is 8, which corresponds to the histogram being defined based on eight buckets.

The technique of this Example 5 can be visualized as rotating the imprints 514 to provide table 520. Table 520 includes a column 522 whose values correspond to particular positions in the bit vectors 514. The table 520 includes a column 524 whose values correspond to the values of the partitions 512 at the respective bit position in the imprints 514. It can be seen that the length of the imprints in the column 524 is 16 bits, which corresponds to the number of partitions in the table 510. Thus, each row 530 of the table 520 summarizes the values for the partitions 512 for a particular bucket in the histogram. The imprints in column 524 can be referred to as imprint bit slices, since they represent a slice of the data subsets 512 at a given bit position of the imprints 514.

An imprint 540 can be created for a query using a representation analogous to the imprints 514, where a bit is set to 1 for each bucket that contains a value requested by the query (where the query may or may not be a range query). In the imprint 540, bits having a value of 1 correspond to buckets that may have values requested by the query, and bits with a value of 0 correspond to buckets that do not have values requested by the query. Thus, when evaluating data subsets that may be responsive to the query, the inquiry can focus on the buckets that may have values responsive to the query, and other buckets can be ignored. So, in the case of the imprint 540, the second and eighth bits are set to 1. The bit vectors in the table 520, or imprint bit slices, corresponding to the second and eighth buckets, rows 530a, 530b are thus relevant, and the remaining rows are not relevant to the query.

A logical OR operation can be performed between the imprints of the rows 530a, 530b to provide a bit vector that corresponds to partitions that may have data responsive to the query. In this example, the result of the OR operation is 0100101001001001, which indicates that only six out of sixteen partitions need be transferred and further evaluated to determine whether they include data responsive to the query. Although the same result could be obtained using the imprints in the form of table 510, using the imprint bit slices of the 520 is advantageous because only two OR operations need be performed to identify the six potentially relevant partitions, rather than performing sixteen AND operations. In addition, since the length of the imprints 524 does not need to correspond to a cache size for a CPU architecture, a greater number of buckets could be used, if desired. Finally, note that the imprint bit slices 524 typically include long runs (in this case, of value 0). The bit slices 524 therefore may be more suitable for compression, such as using run-length encoding, than the imprints 514.

Example 6—Example Database Environment

Figure 6:
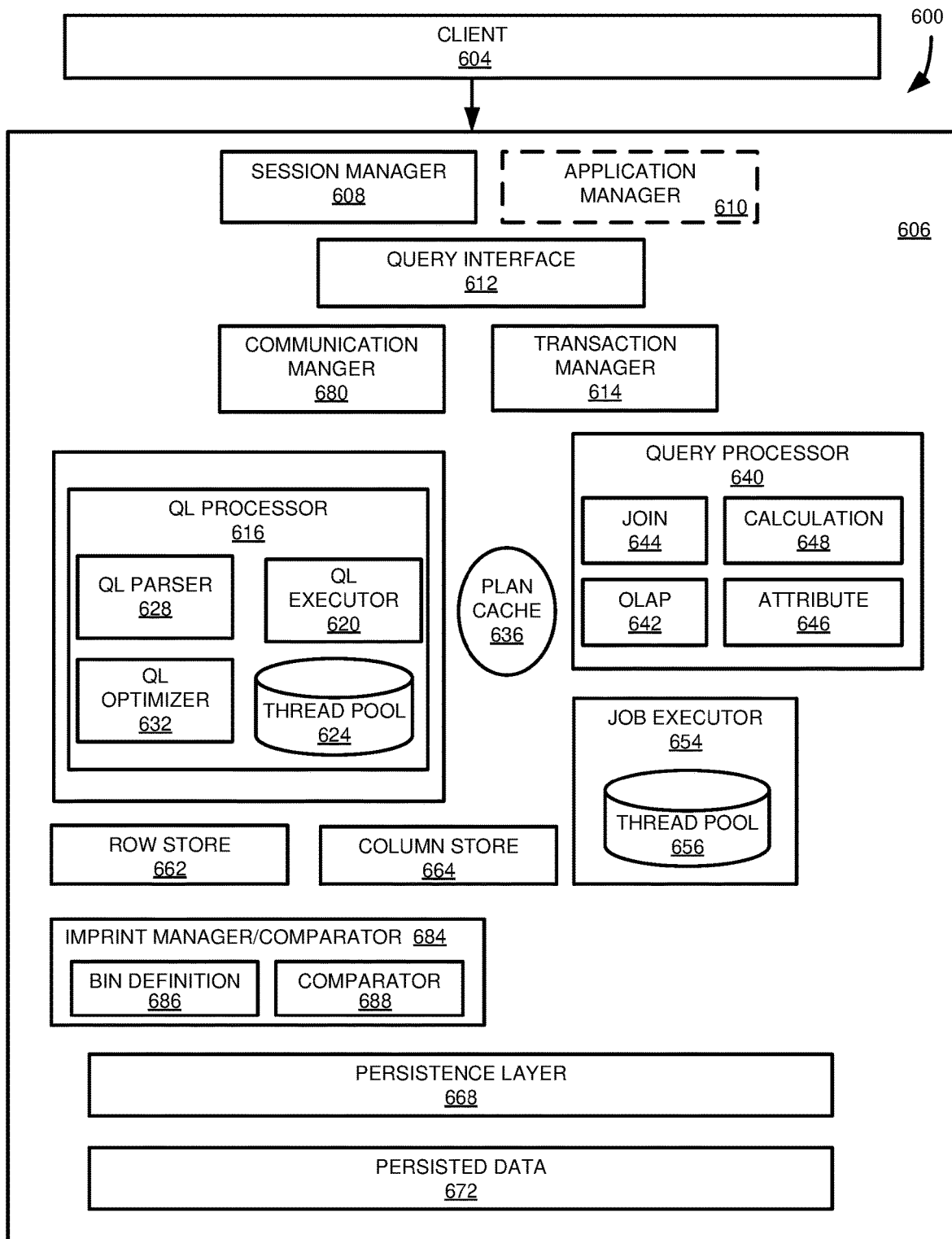
FIG. 6 is a block diagram of an example database environment in which disclosed technologies can be implemented.

FIG. 6 illustrates an example database environment 600 in which disclosed technologies can be implemented. The database environment 600 can include a client 604. Although a single client 604 is shown, the client 604 can represent multiple clients. The client or clients 604 may be OLAP clients, OLTP clients, or a combination thereof.

The client 604 is in communication with a database server 606. Through various subcomponents, the database server 606 can process requests for database operations, such as requests to store, read, or manipulate data. A session manager component 608 can be responsible for managing connections between the client 604 and the database server 606, such as clients communicating with the database server using a database programming interface, such as Java Database Connectivity (JDBC), Open Database Connectivity (ODBC), or Database Shared Library (DBSL). Typically, the session manager 608 can simultaneously manage connections with multiple clients 604. The session manager 608 can carry out functions such as creating a new session for a client request, assigning a client request to an existing session, and authenticating access to the database server 606. For each session, the session manager 608 can maintain a context that stores a set of parameters related to the session, such as settings related to committing database transactions or the transaction isolation level (such as statement level isolation or transaction level isolation).

For other types of clients 604, such as web-based clients (such as a client using the HTTP protocol or a similar transport protocol), the client can interface with an application manager component 610. Although shown as a component of the database server 606, in other implementations, the application manager 610 can be located outside of, but in communication with, the database server 606. The application manager 610 can initiate new database sessions with the database server 606, and carry out other functions, in a similar manner to the session manager 608.

The application manager 610 can determine the type of application making a request for a database operation and mediate execution of the request at the database server 606, such as by invoking or executing procedure calls, generating query language statements, or converting data between formats useable by the client 604 and the database server 606. In particular examples, the application manager 610 receives requests for database operations from a client 604, but does not store information, such as state information, related to the requests.

Once a connection is established between the client 604 and the database server 606, including when established through the application manager 610, execution of client requests is usually carried out using a query language, such as the structured query language (SQL). In executing the request, the session manager 608 and application manager 610 may communicate with a query interface 612. The query interface 612 can be responsible for creating connections with appropriate execution components of the database server 606. The query interface 612 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 614. The transaction manager component 614 can be responsible for operations such as coordinating transactions, managing transaction isolation, tracking running and closed transactions, and managing the commit or rollback of transactions. In carrying out these operations, the transaction manager 614 can communicate with other components of the database server 606.

The query interface 612 can communicate with a query language processor 616, such as a structured query language processor. For example, the query interface 612 may forward to the query language processor 616 query language statements or other database operation requests from the client 604. The query language processor 616 can include a query language executor 620, such as a SQL executor, which can include a thread pool 624. Some requests for database operations, or components thereof, can be executed directly by the query language processor 616. Other requests, or components thereof, can be forwarded by the query language processor 616 to another component of the database server 606. For example, transaction control statements (such as commit or rollback operations) can be forwarded by the query language processor 616 to the transaction manager 614. In at least some cases, the query language processor 616 is responsible for carrying out operations that retrieve or manipulate data (e.g., SELECT, UPDATE, DELETE). Other types of operations, such as queries, can be sent by the query language processor 616 to other components of the database server 606. The query interface 612, and the session manager 608, can maintain and manage context information associated with requests for database operation. In particular implementations, the query interface 612 can maintain and manage context information for requests received through the application manager 610.

When a connection is established between the client 604 and the database server 606 by the session manager 608 or the application manager 610, a client request, such as a query, can be assigned to a thread of the thread pool 624, such as using the query interface 612. In at least one implementation, a thread is associated with a context for executing a processing activity. The thread can be managed by an operating system of the database server 606, or by, or in combination with, another component of the database server. Typically, at any point, the thread pool 624 contains a plurality of threads. In at least some cases, the number of threads in the thread pool 624 can be dynamically adjusted, such in response to a level of activity at the database server 606. Each thread of the thread pool 624, in particular aspects, can be assigned to a plurality of different sessions.

When a query is received, the session manager 608 or the application manager 610 can determine whether an execution plan for the query already exists, such as in a plan cache 636. If a query execution plan exists, the cached execution plan can be retrieved and forwarded to the query language executor 620, such as using the query interface 612. For example, the query can be sent to an execution thread of the thread pool 624 determined by the session manager 608 or the application manager 610. In a particular example, the query plan is implemented as an abstract data type.

If the query is not associated with an existing execution plan, the query can be parsed using a query language parser 628. The query language parser 628 can, for example, check query language statements of the query to make sure they have correct syntax, and confirm that the statements are otherwise valid. For example, the query language parser 628 can check to see if tables and records recited in the query language statements are defined in the database server 606.

The query can also be optimized using a query language optimizer 632. The query language optimizer 632 can manipulate elements of the query language statement to allow the query to be processed more efficiently. For example, the query language optimizer 632 may perform operations such as unnesting queries or determining an optimized execution order for various operations in the query, such as operations within a statement. After optimization, an execution plan can be generated, or compiled, for the query. In at least some cases, the execution plan can be cached, such as in the plan cache 636, which can be retrieved (such as by the session manager 608 or the application manager 610) if the query is received again.

Once a query execution plan has been generated or received, the query language executor 620 can oversee the execution of an execution plan for the query. For example, the query language executor 620 can invoke appropriate subcomponents of the database server 606.

In executing the query, the query language executor 620 can call a query processor 640, which can include one or more query processing engines. The query processing engines can include, for example, an OLAP engine 642, a join engine 644, an attribute engine 646, or a calculation engine 648. The OLAP engine 642 can, for example, apply rules to create an optimized execution plan for an OLAP query. The join engine 644 can be used to implement relational operators, typically for non-OLAP queries, such as join and aggregation operations. In a particular implementation, the attribute engine 646 can implement column data structures and access operations. For example, the attribute engine 646 can implement merge functions and query processing functions, such as scanning columns.

In certain situations, such as if the query involves complex or internally-parallelized operations or sub-operations, the query executor 620 can send operations or sub-operations of the query to a job executor component 654, which can include a thread pool 656. An execution plan for the query can include a plurality of plan operators. Each job execution thread of the job execution thread pool 656, in a particular implementation, can be assigned to an individual plan operator. The job executor component 654 can be used to execute at least a portion of the operators of the query in parallel. In some cases, plan operators can be further divided and parallelized, such as having operations concurrently access different parts of the same table. Using the job executor component 654 can increase the load on one or more processing units of the database server 606, but can improve execution time of the query.

The query processing engines of the query processor 640 can access data stored in the database server 606. Data can be stored in a row-wise format in a row store 662, or in a column-wise format in a column store 664. In at least some cases, data can be transformed between a row-wise format and a column-wise format. A particular operation carried out by the query processor 640 may access or manipulate data in the row store 662, the column store 664, or, at least for certain types of operations (such a join, merge, and subquery), both the row store 662 and the column store 664. In at least some aspects, the row store 662 and the column store 664 can be maintained in main memory.

A persistence layer 668 can be in communication with the row store 662 and the column store 664. The persistence layer 668 can be responsible for actions such as committing write transaction, storing redo log entries, rolling back transactions, and periodically writing data to storage to provided persisted data 672.

In executing a request for a database operation, such as a query or a transaction, the database server 606 may need to access information stored at another location, such as another database server. The database server 606 may include a communication manager 680 component to manage such communications. The communication manger 680 can also mediate communications between the database server 606 and the client 604 or the application manager 610, when the application manager is located outside of the database server.

In some cases, the database server 606 can be part of a distributed database system that includes multiple database servers. At least a portion of the database servers may include some or all of the components of the database server

606. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 606 may need to access other database servers, or other information sources, within the database system. The communication manager 680 can be used to mediate such communications. For example, the communication manager 680 can receive and route requests for information from components of the database server 606 (or from another database server) and receive and route replies.

The database system 600 can include a imprint manager/comparator 684. The imprint manager/comparator 684 can define bins to provide bin definitions 686. In creating the bins, the imprint manager/comparator 684 can use techniques described in Examples 1-5, including creating bins based at least in part on a workload, creating a set of bins that includes a bin for frequently occurring values, or combinations thereof. The imprint manager/comparator 684 can create imprints for data or queries, including using the bin definitions 686. Imprints for data can include constructing imprint bit slices that summarize the data on a bin-by-bin basis. A comparator 688 can compare data and query imprints to determine data that may be relevant to a query.

Example 7—Example Operations Using Data Imprints

FIG. 7 is a flowchart of a method 700 for defining an imprint for a data set using bins defined at least in part on queries received for the data set. The method 700 can be implemented in the database system 600 of FIG. 6.

At 704, a plurality of first queries are received. Respective queries specify a lower bound value and an upper bound value for a value type. A plurality of unique values for the value type are determined at 708. The data set is partitioned into a plurality of discrete subsets. At 712, a plurality of bins are defined based at least in part on upper bounds and lower bounds specified by the plurality of first queries. A given bin of the plurality of bins includes at least one unique value of the plurality of unique values. An imprint is defined at 716 for at least one discrete data subset of the plurality of data subsets. For each bin of the plurality of bins, the imprint identifies whether a unique value associated with a given bin is present in the at least one discrete data subset.

FIG. 8 is a flowchart of a method 800 for defining bins for a data set, where a bin is designated to be associated with values exceeding a threshold frequency. The method 800 can be implemented in the database system 600 of FIG. 6.

At 804, a plurality of unique values are determined for a value type in a data set. The data set is partitioned into a plurality of discrete data subsets. At least one unique value is determined at 808 that has a frequency that satisfies a threshold. At 812, a plurality of bins are defined. A given bin of the plurality of bins includes at least one unique value of the plurality of unique values.

A first bin is designated, at 816, to be associated with unique values satisfying the threshold. At 820, the first bin is associated with the at least one unique value. For at least unique values of the plurality of unique values other than the at least one unique value, at 824, the unique values are associated with bins of the plurality of bins other than the first bin. At 828, an imprint is defined for at least one discrete data subset of the plurality of discrete data subsets. For each bin of the plurality of bins, the imprint identifies whether a unique value associated with the given bin is present in the at least one discrete data subset.

FIG. 9 is a flowchart of a method 900 for defining bin imprints. The method 900 can be implemented in the database system 600 of FIG. 6.

At 904, a data set is partitioned into a plurality of data subsets. A plurality of unique values in the data set are determined at 908. At 912, a plurality of bins are defined. Each bin of the plurality of bins is associated with at least one unique value of the plurality of unique values. Bin imprints for the plurality of bins are defined at 916. A bin imprint identifies whether data subsets of the plurality of data subsets include values associated with the respective bin.

Example 8—Computing Systems

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing the features described in Examples 1-7. A processing unit can be a general-purpose central processing unit (CPU), processor in an application-specific integrated circuit (ASIC), a field programmable gate array (FPGA), or any other type of processor, or combination of processors. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 may have additional features. For example, the computing system 1000 includes storage 1040, one or more input devices 1050, one or more output devices 1060, and one or more communication connections 1070, including input devices, output devices, and communication connections for interacting with a user. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way, and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9—Cloud Computing Environment

Figure 11:
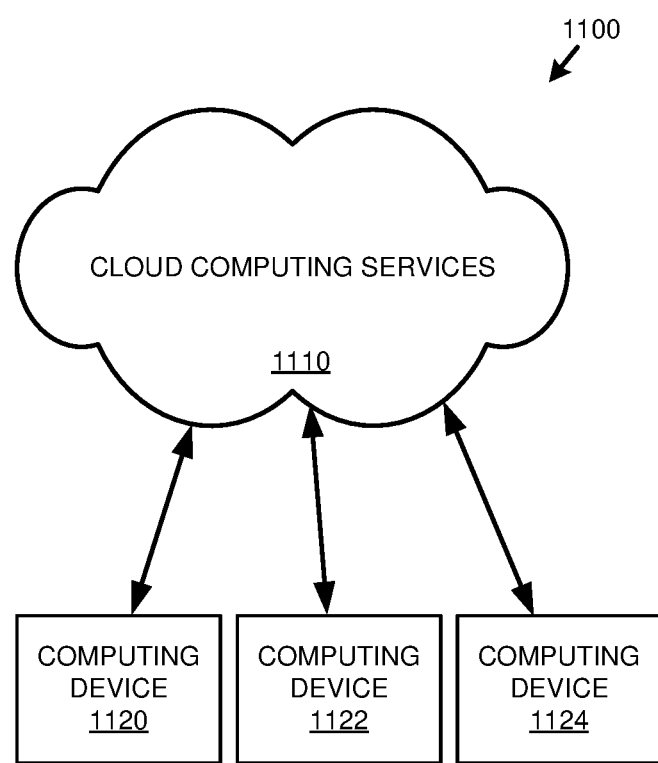
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

Example 10—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 22, computer-readable storage media include memory 2220 and 2225, and storage 2240. The term computer-readable storage media does not include signals and carrier waves. In addition, the term computer-readable storage media does not include communication connections (e.g., 2270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   one or more memories;
   one or more hardware processing units coupled to the one or more memories; and
   one or more computer readable storage media storing computer-executable instructions that, when executed, cause the computing system to perform operations comprising:
   partitioning a data set into a plurality of data subsets;
   determining a plurality of unique values in the data set;
   defining a plurality of bins, each bin of the plurality of bins being associated with at least one unique value of the plurality of unique values, wherein the defining the plurality of bins comprises (1) determining that a first value specified by a plurality of queries of the data set satisfies a threshold occurrence frequency; and (2) defining a first bin of the plurality of bins for values satisfying the threshold occurrence frequency, wherein the first bin is defined to include the first value; and
   defining bin imprints for the plurality of bins, wherein a bin imprint identifies whether data subsets of the plurality of data subsets comprise values associated with a respective bin.

2. The computing system of claim 1, wherein the bin imprints comprise respective bit vectors having a plurality of bits, wherein bits in the bit vector correspond to the plurality of data subsets, and a bit in a given bit vector has a first value if a data subset comprises at least one value associated with a given bin and a second value otherwise, wherein the first value is different than the second value.

3. The computing system of claim 2, wherein a length of the bit vectors is equal to a number of data subsets.

4. The computing system of claim 2, the operations further comprising:
   compressing the bit vectors.

5. The computing system of claim 1, the operations further comprising:
   receiving a query, the query requesting one or more values of the data set;
   defining a query imprint for the query, the query imprint indicating values requested by the query;
   comparing the query imprint with one or more of the bin imprints;
   based at least in part on the comparing, determining one or more data subsets that may contain values requested by the query; and
   sending data subsets that may contain values requested by the query in response to the query.

6. The computing system of claim 5, wherein the query imprint comprises a query bit vector and the comparing comprises performing a logical AND operation between the query bit vector and bit vectors for the bin imprints.

7. The computing system of claim 1, wherein defining a plurality of bins is based at least in part on weights assigned to the plurality of unique values.

8. The computing system of claim 7, wherein weights of the weights are determined at least in part on a frequency at which a given unique value occurs in the data set.

9. The computing system of claim 8, the operations further comprising:
   determining a cost of placing a first bin boundary based at least in part on the weights, wherein the first bin boundary defines, at least in part, the at least one unique value associated with at least one bin of the plurality of bins.

10. The computing system of claim 9, the operations further comprising:
    iteratively defining additional bin boundaries based on costs associated with such definitions, wherein the costs are determined based at least in part on any previously defined bin boundaries.

11. The computing system of claim 1, the operations further comprising:
    receiving a plurality of first queries, wherein respective first queries of the plurality of first queries specify a lower bound value and an upper bound value for a value type; and
    wherein the defining a plurality of bins is based at least in part on upper bounds and lower bounds specified by the plurality of first queries.

12. A method, implemented in a computing system comprising one or more memories and one or more hardware processing units coupled to the one or more memories, the method comprising:
    partitioning a data set into a plurality of data subsets;
    determining a plurality of unique values in the data set;
    defining a plurality of bins, each bin of the plurality of bins being associated with at least one unique value of the plurality of unique values; and defining bin imprints for the plurality of bins, wherein a bin imprint identifies whether data subsets of the plurality of data subsets comprise values associated with a respective bin, the defining bin imprints comprising defining a first bin imprint for a first bin of the plurality of bins based on values for multiple data subsets of the plurality of data subsets and defining a second bin imprint for a second bin of the plurality of bins based on values for multiple data subsets of the plurality of data subsets.

13. The method of claim 12, further comprising:
receiving a query, the query requesting one or more values of the data set;
defining a query imprint for the query, the query imprint indicating values requested by the query;
comparing the query imprint with one or more of the bin imprints;
based at least in part on the comparing, determining one or more data subsets that may contain values requested by the query; and
sending data subsets that may contain values requested by the query in response to the query.

14. The method of claim 12, wherein defining a plurality of bins is based at least in part on weights assigned to the plurality of unique values, wherein weights of the weights are determined at least in part on a frequency at which a given unique value occurs in the data set.

15. The method of claim 14, further comprising:
determining a cost of placing a first bin boundary based at least in part on the weights, wherein the first bin boundary defines, at least in part, the at least one unique value associated with at least one bin of the plurality of bins.

16. The method of claim 15, further comprising:
iteratively defining additional bin boundaries based on costs associated with such definitions, wherein the costs are determined based at least in part on any previously defined bin boundaries.

17. One or more computer-readable storage media comprising:
computer-executable instructions that, when executed by a computing system comprising at least one hardware processor and at least one memory coupled to the at least one hardware processor, cause the computing system to partition a data set into a plurality of data subsets;
computer-executable instructions that, when executed by the computing system, cause the computing system to determine a plurality of unique values in the data set;
computer-executable instructions that, when executed by the computing system, cause the computing system to define a plurality of bins based at least in part on one or more values specified in at least one query of the data set, each bin of the plurality of bins being associated with at least one unique value of the plurality of unique values; and
computer-executable instructions that, when executed by the computing system, cause the computing system to define bin imprints for the plurality of bins, wherein a bin imprint identifies whether data subsets of the plurality of data subsets comprise values associated with a respective bin.

18. The one or more computer-readable storage media of claim 17, wherein the computer-executable instructions that cause the computing system to define a plurality of bins use weights assigned to the plurality of unique values, wherein weights of the weights are determined at least in part on a frequency at which a given unique value occurs in the data set.

19. The one or more computer-readable storage media of claim 18, further comprising:
computer-executable instructions that, when executed by the computing system, cause the computing system to determine a cost of placing a first bin boundary based at least in part on the weights, wherein the first bin boundary defines, at least in part, the at least one unique value associated with at least one bin of the plurality of bins.

20. The one or more computer-readable storage media of claim 19, further comprising:
computer-executable instructions that, when executed by the computing system, cause the computing system to iteratively define additional bin boundaries based on costs associated with such definitions, wherein the costs are determined based at least in part on any previously defined bin boundaries.

21. The computing system of claim 1, wherein the defining a plurality of bins is based at least in part on one or more values specified in at least one query of the data set.

22. The method of claim 12, wherein the defining a plurality of bins is based at least in part on one or more values specified in at least one query of the data set.

23. The computing system of claim 2, wherein a length of the bit vector is equal to a number of bins of the plurality of bins.

* * * * *